US012664933B2

(12) United States Patent
An et al.

(10) Patent No.: US 12,664,933 B2
(45) Date of Patent: Jun. 23, 2026

(54) DISPLAY DEVICE, AND METHOD OF DRIVING THE SAME, AND ELECTRONIC DEVICE

(71) Applicant: Samsung Display Co., Ltd., Yongin-si (KR)

(72) Inventors: Jung Eon An, Yongin-si (KR); Ki Hyun Pyun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/083,275

(22) Filed: Mar. 18, 2025

(65) Prior Publication Data

US 2025/0384816 A1 Dec. 18, 2025

(30) Foreign Application Priority Data

Jun. 13, 2024 (KR) ........................ 10-2024-0077062

(51) Int. Cl.
*G09G 3/32* (2016.01)
*G09G 3/3225* (2016.01)

(52) U.S. Cl.
CPC ............. *G09G 3/32* (2013.01); *G09G 3/3225* (2013.01); *G09G 2310/08* (2013.01); *G09G 2330/023* (2013.01); *G09G 2330/028* (2013.01)

(58) Field of Classification Search
None
See application file for complete search history.

(56) References Cited

U.S. PATENT DOCUMENTS

| | | | | |
|---|---|---|---|---|
| 9,638,949 B1 | 5/2017 | Kim et al. | | |
| 9,696,837 B1 | 7/2017 | Kim | | |
| 11,239,286 B2 | 2/2022 | Park et al. | | |
| 11,341,916 B2 | 5/2022 | Lee et al. | | |
| 2010/0171733 A1* | 7/2010 | Kobayashi | ........... | G09G 3/3208 345/211 |
| 2017/0193900 A1* | 7/2017 | Kwon | .................. | G09G 3/3275 |
| 2018/0033372 A1* | 2/2018 | Kishi | ................... | G09G 3/3233 |

(Continued)

FOREIGN PATENT DOCUMENTS

| | | |
|---|---|---|
| KR | 10-2017-0077780 A | 7/2017 |
| KR | 10-2527847 B1 | 5/2023 |

(Continued)

*Primary Examiner* — Nicholas J Lee
(74) *Attorney, Agent, or Firm* — Womble Bond Dickinson (US) LLP

(57) ABSTRACT

A display device includes a display component including pixels connected to a first power line, a second power line, scan lines, and data lines; a sensing resistor between the first power line and the display component; a current sensing component connected to the sensing resistor, and configured to measure sensing current flowing through the first power line; a timing controller configured to generate a voltage code based on input data; and a power generator configured to supply first driving power having a voltage corresponding to the voltage code to the first power line, wherein, in response to a static image being displayed on the displayed component, the timing controller is configured to change the voltage code to decrease the first driving power, and wherein, in response to a decrease in the voltage of the first driving power, a driving transistor in a pixel is driven in a linear region.

17 Claims, 14 Drawing Sheets

(56) References Cited

U.S. PATENT DOCUMENTS

| | | | | |
|---|---|---|---|---|
| 2021/0256904 | A1* | 8/2021 | Kang .................. | G09G 3/3225 |
| 2022/0215803 | A1* | 7/2022 | Pyun .................... | G09G 3/3258 |

FOREIGN PATENT DOCUMENTS

| | | | |
|---|---|---|---|
| KR | 10-2552964 | B1 | 7/2023 |
| KR | 10-2642305 | B1 | 2/2024 |
| KR | 10-2668839 | B1 | 5/2024 |

* cited by examiner

DISPLAY DEVICE, AND METHOD OF DRIVING THE SAME, AND ELECTRONIC DEVICE

CROSS-REFERENCE TO RELATED APPLICATION

The present application claims priority to Korean Patent Application Number 10-2024-0077062, filed on Jun. 13, 2024, in the Korean Intellectual Property Office, the entire disclosure of which is incorporated herein by reference.

BACKGROUND

1. Field

Aspects of the present disclosure relate to a display device, a method of driving the display device, and an electronic device.

2. Description of Related Art

With the development of information technology, the importance of display devices, which serve as a connection medium between a user and information, has been emphasized. Owing to the importance of display devices, the use of various kinds of display devices, such as a liquid crystal display device and an organic light emitting display device, has increased.

The display device may use a plurality of pixels to display an image. The pixels may generate light having a certain luminance while controlling the amount of current flowing from a first driving power supply to a second driving power supply.

The voltage of the first driving power supply may be changed in response to a load and a peak grayscale value of a display component that includes the pixels.

The above information disclosed in this Background section is only for enhancement of understanding of the background of the invention and therefore it may contain information that does not form the prior art.

SUMMARY

Aspects of some embodiments of the present disclosure are directed to a display device capable of reducing (e.g., minimizing) power consumption by optimizing a voltage of a first driving power supply, a method of driving the display device, and an electronic device.

Aspects of some embodiments of the present disclosure are directed to a display device capable of increasing luminance by optimizing the voltage of the first driving power supply and increasing the amount of current of the first driving power supply, a method of driving the display device, and an electronic device.

According to some embodiments, there is provided a display device including: a display component including pixels connected to a first power line, a second power line, scan lines, and data lines; a sensing resistor between the first power line and the display component; a current sensing component connected to the sensing resistor, and configured to measure sensing current flowing through the first power line; a timing controller configured to generate a voltage code based on input data; and a power generator configured to supply first driving power having a voltage corresponding to the voltage code to the first power line, wherein, in response to a static image being displayed on the displayed component, the timing controller is configured to change the voltage code so that the voltage of the first driving power decreases, and wherein, in response to a decrease in the voltage of the first driving power, a driving transistor in at least one pixel among the pixels is driven in a linear region.

In some embodiments, based on power consumption being reduced by first power consumption in response to a decrease in the voltage of the first driving power, the timing controller is configured to increase current of the first driving power such that the power consumption increases by the first power consumption.

In some embodiments, the timing controller is configured to generate output data by changing the input data such that the current of the first driving power is increased.

In some embodiments, the power generator includes: an analog-digital converter configured to generate a reference voltage in response to the voltage code; and a DC-DC converter configured to generate the first driving power based on the reference voltage.

In some embodiments, the timing controller includes: an analyzer configured to extract a load and a peak grayscale value of the input data, and to generate a static image signal in response to the static image being displayed on the display component; a code value generator configured to generate the voltage code corresponding to the load and the peak grayscale; and a power controller configured to control the code value generator such that the voltage of the first driving power is reduced in response to the static image signal being inputted.

In some embodiments, the analyzer includes: a load analyzer configured to calculate the load of the input data; and a grayscale analyzer configured to extract the peak grayscale value of the input data.

In some embodiments, the load analyzer is further configured to supply the static image signal to the power controller in response to the static image being displayed on the display component.

In some embodiments, the analyzer further includes a static image determination component configured to supply the static image signal to the power controller in response to the static image is displayed on the display component.

In some embodiments, the timing controller includes: a scale factor generator configured to set a target current corresponding to the load, and to generate a scale factor such that the sensing current matches the target current; and a data changing component configured to generate output data by reflecting the scale factor in the input data.

In some embodiments, the power controller is configured to: receive the sensing current from the current sensing component, the target current from the scale factor generator, and the static image signal from the analyzer; and receive, from an external device, current reduction information including information about a first desired current value that is a current value lower than the target current, frame information including information about a certain frame unit, and voltage information including information about a certain voltage value.

In some embodiments, the current reduction information includes percentage (%) information, and the power controller is configured to generate the first desired current value by reflecting the percentage information in the target current.

In some embodiments, wherein the power controller is further configured to control the code value generator such that, in response to the static image signal being inputted, the voltage of the first driving power decreases by the certain voltage value on a basis of the certain frame unit, and the code value generator is further configured to generate the voltage code such that the voltage of the first driving power decreases by the certain voltage value on a basis of the certain frame unit in response to control of the power controller.

In some embodiments, the power controller is further configured to control the code value generator such that the voltage of the first driving power decreases until the sensing current is set to the first desired current value.

In some embodiments, during a period in which the voltage of the first driving power is controlled by the power controller, the scale factor generator is further configured to maintain the scale factor at a constant value.

In some embodiments, the power controller is further configured to supply information about a second desired current value that is a current value higher than the target current to the scale factor generator.

In some embodiments, the scale factor generator is further configured to generate the scale factor such that, after the voltage of the first driving power decreases and the sensing current is set to approximately the first desired current value, current of the first driving power has the second desired current value.

According to some embodiments, there is provided a method of driving a display device, including: controlling a voltage of first driving power in response to a load and a peak grayscale value of input data; and decreasing the voltage of the first driving power in response to a static image being displayed on a display component including pixels, wherein decreasing the voltage of the first driving power includes decreasing the voltage of the first driving power such that a driving transistor in at least one pixel among the pixels is driven in a linear region.

In some embodiments, the method further includes, based on power consumption being reduced by first power consumption in response to a decrease in the voltage of the first driving power, increasing current flowing through the first driving power such that the power consumption increases by approximately the first power consumption.

According to some embodiments, there is provided an electronic device including: a display panel including pixels; a voltage generation circuit configured to supply first driving power having a certain voltage to the display panel based on a voltage code; a current sensing component configured to measure a voltage of the first driving power supplied to the display panel and to generate sensing current; and a controller configured to generate the voltage code based on input data, wherein, in response to a static image being displayed on the display panel, the controller is further configured to change the voltage code so that the voltage of the first driving power decreases, and wherein the voltage of the first driving power decreases so that a driving transistor in at least one pixel among the pixels is driven in a linear region.

In some embodiments, based on power consumption being reduced by first power consumption in response to a decrease in the voltage of the first driving power, the controller generates output data by changing the input data such that the power consumption increases by approximately the first power consumption.

The objects of the present disclosure are not limited to the above-stated object, and those skilled in the art will clearly understand other not mentioned objects from the accompanying claims.

DETAILED DESCRIPTION

Figure 1:
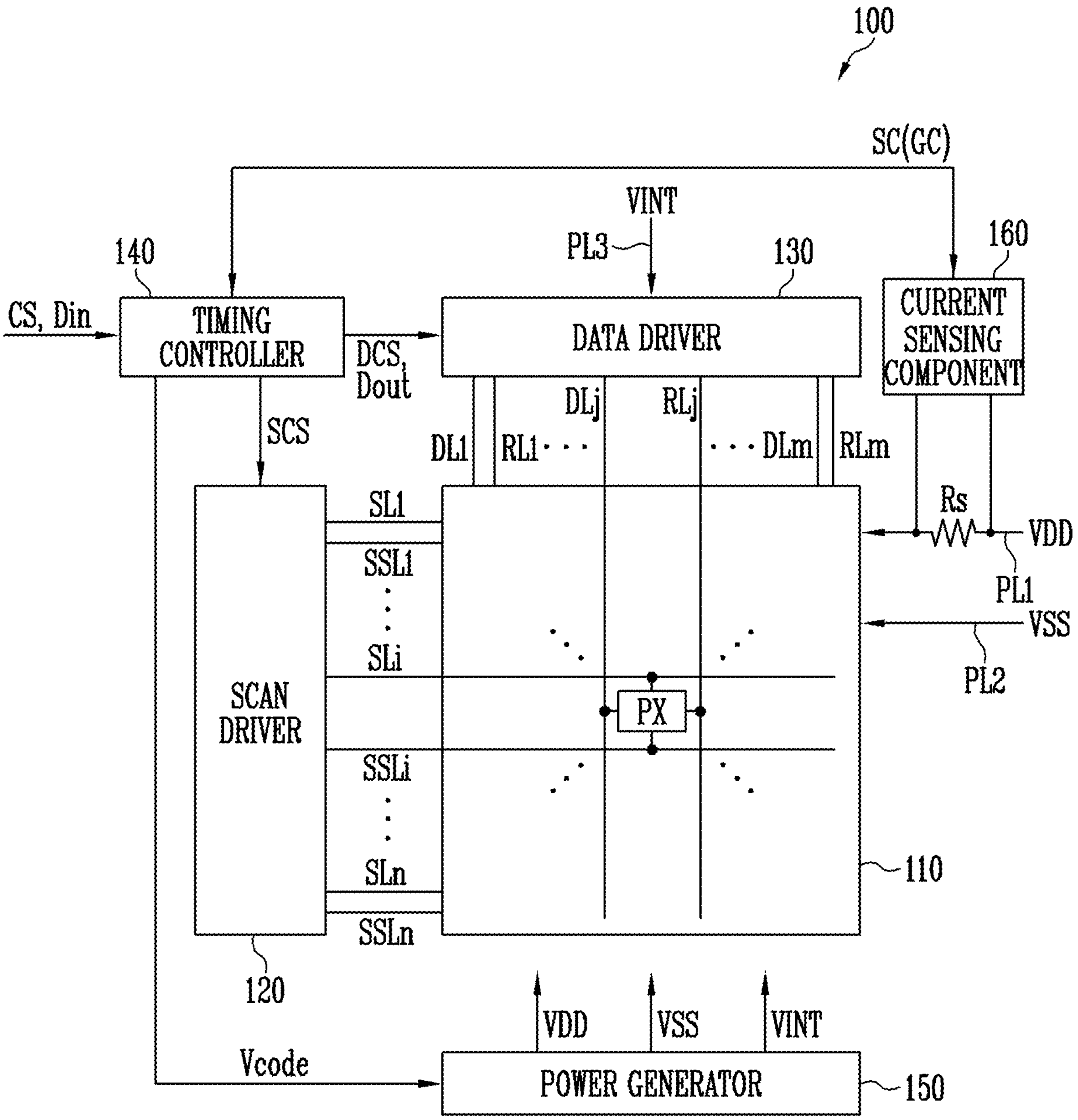
FIG. 1 is a diagram illustrating a display device in accordance with some embodiments of the present disclosure.

Hereinafter, embodiments of the present disclosure will be described in detail with reference to the attached drawings, such that those skilled in the art can easily implement the present disclosure. The present disclosure may be implemented in various forms, and is not limited to the embodiments to be described herein below.

In the drawings, portions which are not related to the present disclosure may be omitted in order to explain the present disclosure more clearly. Reference should be made to the drawings, in which similar reference numerals are used throughout the different drawings to designate similar components. Therefore, the aforementioned reference numerals may be used in other drawings.

Furthermore, the expression “being the same” may mean “being substantially the same”. In other words, the expression “being the same” may include a tolerance range as understood by those skilled in the art.

Some embodiments are described in the accompanying drawings in connection with functional blocks, units and/or modules. Those skilled in the art will understand that such blocks, units, and/or modules are physically implemented by logic circuits, discrete components, microprocessors, hard-wired circuits, memory elements, line connections, and other electronic circuits. This may be formed using semiconductor-based fabrication techniques or other fabrication techniques. For blocks, units, and/or modules implemented by a microprocessor or other similar hardware, they may be programmed and controlled using software to perform various functions discussed herein, and may be optionally driven by firmware and/or software. In addition, each block, unit, and/or module may be implemented by dedicated hardware, or be implemented by a combination of the dedicated hardware which performs some functions and a processor which performs different functions (e.g. one or more programmed microprocessors and related circuits). Furthermore, in some embodiments, blocks, units and/or modules may be physically separated into two or more individual blocks, units and/or modules which interact with each other without departing from the scope of the inventive concept. In some embodiments, blocks, units and/or modules may be physically combined into more complex blocks, units and/or modules without departing from the scope of the inventive concept.

The term "connection" between two components may embrace electrical connection and physical connection, but the present disclosure is not limited thereto. For example, the term "connection" used in description with reference to a circuit diagram may refer to electrical connection, and the term "connection" used in description with reference to a sectional view or a plan view may refer to physical connection.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure.

However, the present disclosure is not limited to the following embodiments and may be modified into various suitable forms. Each of the embodiments to be described below may be implemented alone, or combined with at least another embodiment to make various combinations of embodiments.

FIG. 1 is a diagram illustrating a display device 100 in accordance with some embodiments of the present disclosure.

Referring to FIG. 1, the display device 100 in accordance with some embodiments of the present disclosure may include a display component 110 (e.g., a display panel), a scan driver 120, a data driver 130, a timing controller 140, a power generator 150, and a current sensing component 160. The scan driver 120, the data driver 130, the timing controller 140, the power generator 150, and the current sensing component 160 may form a driving device provided to drive the display component 110.

The display component 110 may display an image. The display component 110 may include pixels PX connected to first scan lines SL1, . . . , SLi, . . . , and SLn, second scan lines SSL1, . . . , SSLi, . . . , and SSLn, data lines DL1, . . . , DLj, . . . , and DLm, and readout lines RL1, . . . , RLj, . . . , and RLm (where n and m each is a natural number of 3 or more, i is a natural number ranging from 1 to n, and j is a natural number ranging from 1 to m).

The pixel PX may be connected to one of the first scan lines SL1 to SLn and one of the data lines DL1 to DLm. Furthermore, the pixel PX may be connected to one of the second scan lines SSL1 to SSLn and one of the readout lines RL1 to RLm.

For example, the pixel PX positioned on the i-th row and the j-th column may be connected to an i-th first scan line SLi, an i-th second scan line SSLi, a j-th data line DLj, and a j-th readout line RLj. Furthermore, the pixel PX may be connected to a first power line PL1 to which a first driving power supply (e.g., a first driving power) VDD is applied, and a second power line PL2 to which a second driving power supply (e.g., a second driving power) VSS is applied.

The first driving power supply VDD may supply driving current to the pixel PX. The second driving power supply VSS may receive the driving current from the pixel PX. During an emission period of the pixel PX, the first driving power VDD may be set to a voltage higher than the second driving power VSS.

The pixel PX may be initialized by an initialization power supply (e.g., a initialization power) VINT provided through the readout line RLj in response to a second scan signal provided through the second scan line SSLi, and may be supplied with a data signal (e.g., a data voltage) through the data line DLj in response to a first scan signal provided through the first scan line SLi. The pixel PX may generate light having a luminance corresponding to a data signal while controlling current flowing from the first driving power supply VDD to the second driving power supply VSS via the light emitting element LD (e.g., refer to FIG. 2) in response to the data signal. The initialization power supply VINT may be set to a voltage lower than an operating point (e.g., a threshold voltage) of the light emitting element LD.

The scan driver 120 may generate a first scan signal and a second scan signal based on a scan control signal SCS. The first scan signal may be sequentially supplied to the first scan lines SL1 to SLn. The second scan signal may be sequentially supplied to the second scan lines SSL1 to SSLn.

The scan control signal SCS may include a start signal, a clock signal, and the like, and may be provided from the timing controller 140 to the scan driver 120. The scan driver 120 may be implemented as a shift register configured to sequentially generate and output the first scan signal in the form of a pulse by sequentially shifting the start signal based on the clock signal. Furthermore, the scan driver 120 may generate and output the second scan signal in a manner similar to the scheme of generating the first scan signal. The scan driver 120 may include a first scan driver configured to generate the first scan signal, and a second scan driver configured to generate a second scan signal.

The scan driver 120 along with the pixel PX may be formed in the display component 110. However, the present disclosure is not limited to the aforementioned example. For example, the scan driver 120 may be mounted on a circuit film, and may be connected to the timing controller 140 via at least one circuit film and a printed circuit board.

The data driver 130 may generate a data signal (e.g., a data voltage) based on output data Dout and a data control signal DCS that are provided from the timing controller 140, and provide the data signal to the display component 110 (e.g., the pixel PX) through the data lines DL1 to DLm. Here, the data control signal DCS may include a data enable signal, a data clock signal, and the like. The data driver 130 may provide the initialization power VINT to the display component 110 (e.g., the pixel PX) through the readout lines RL1 to RLm.

In some embodiments, the data driver 130 may receive a sensing signal through the readout lines RL1 to RLm in a separate sensing period (e.g., in a sensing period allocated to sense characteristic information of the pixel PX such as a threshold voltage and/or mobility of a driving transistor included in the pixel PX). The sensing signal may be used to compensate for the characteristics (e.g., a characteristic deviation) of the pixel PX in the data driver 130 and/or the timing controller 140.

In some embodiments, the readout lines RL1 to RLm may be connected to a separate sensing component. In such examples, the sensing component may supply the voltage of the initialization power VINT to the display component 110, or may receive a sensing signal through the readout lines RL1 to RLm.

The power generator 150 may supply the first driving power VDD and the second driving power VSS to the display component 110. The power generator 150 may supply the initialization power VINT to the data driver 130.

The power generator 150 may generate the first driving power VDD having a certain voltage in response to a voltage code Vcode supplied from the timing controller 140. The voltage of the first driving power VDD may be determined in response to the voltage code Vcode. The voltage code Vcode may be set to enable the power consumption to be minimized, and detailed description pertaining thereto will be provided below with reference to FIG. 5.

The power generator 150 may provide a driving voltage for driving at least one of the scan driver 120, the data driver 130, the timing controller 140, and the current sensing component 160. The power generator 150 may be implemented as a power management IC (PMIC).

The first driving power VDD may be supplied to the display component 110 through the first power line PL1. The second driving power VSS may be supplied to the display component 110 through the second power line PL2. The initialization power VINT may be supplied to the data driver 130 through a third power line PL3. The first power line PL1 and the second power line PL2 may be connected in common to the pixels PX. A sensing resistor Rs may be connected to the first power line PL1. In such examples, the voltage (and current) of the first driving power VDD may be supplied to the display component 110 via the sensing resistor Rs.

The current sensing component 160 may be electrically connected to opposite ends of the sensing resistor Rs. The current sensing component 160 may sense current (e.g., the sensing current SC) of the first driving power VDD that flows to the sensing resistor Rs. The sensing current SC (e.g., global current GC) sensed in the current sensing component 160 may be supplied to the timing controller 140.

The timing controller 140 may receive input data Din and a control signal CS from an external device (e.g., a graphic processor, an application processor, or the like), and generate a scan control signal SCS and a data control signal DCS based on the control signal CS.

In some embodiments, the timing controller 140 may receive the sensing current SC, and may generate a scale factor SF (e.g., refer to FIG. 5) such that the sensing current SC can become equal to a target current. The target current may be a current value that should (e.g., is desired to) flow through the display component 110 in response to a load of the input data Din. The timing controller 140 may generate output data Dout by reflecting the scale factor SF in the input data Din.

In some embodiments, the timing controller 140 may generate a voltage code Vcode with reference to a load Load (e.g., refer to FIG. 5) and a peak grayscale value (e.g., refer to FIG. 5) of the input data Din, and supply the generated voltage code Vcode to the power generator 150. In such examples, the voltage of the first driving power VDD may change in response to the load Load and peak grayscale value PG of the input data Din. Consequently, the power consumption of the display device 100 may be reduced.

In some embodiments, the timing controller 140 may control the voltage code Vcode so that the voltage of the first driving power VDD decreases during a period in which a static image is disposed on the display component 110. In such examples, the power consumption of the display device 100 may be further reduced.

Figure 2:
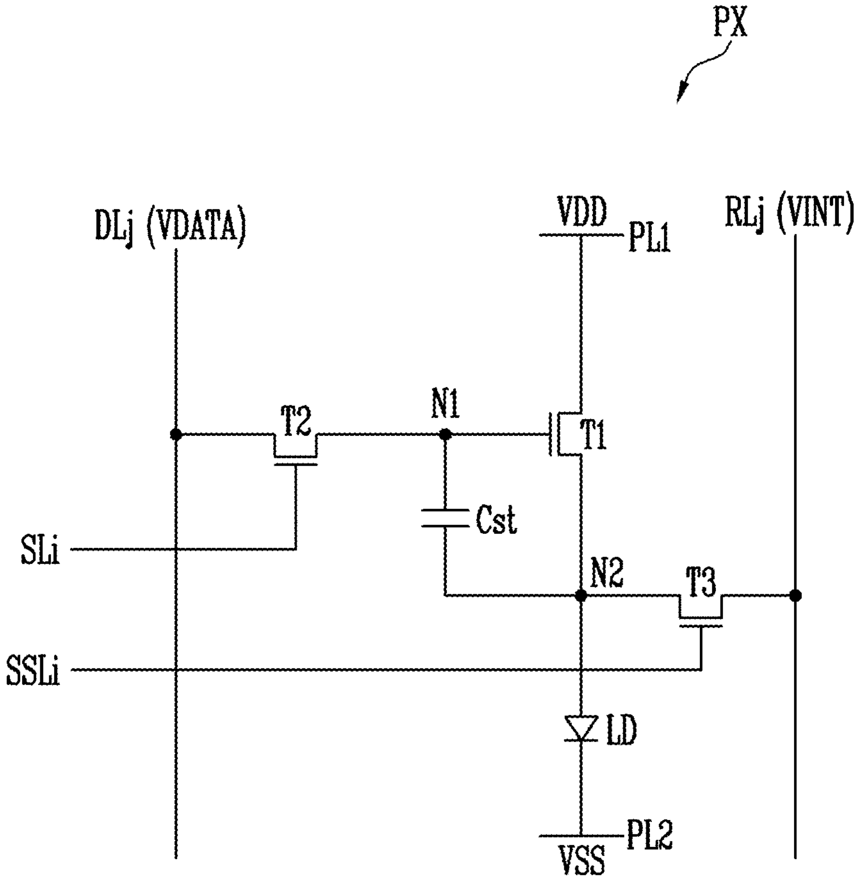
FIG. 2 is a diagram illustrating a pixel of FIG. 1, according to some embodiments of the present disclosure.

FIG. 2 is a diagram illustrating some embodiments of the pixel PX of FIG. 1, according to some embodiments of the present disclosure. FIG. 2 illustrates the pixel PX disposed on an i-th row and a j-th column. However, the structure of the pixel PX is not limited to that illustrated in FIG. 2. For example, in some embodiments of the present disclosure, the pixel PX may be selected as any one of various known circuits.

Referring to FIG. 2, the pixel PX may be connected to the first scan line SLi, the second scan line SSLi, the data line DLj, and the readout line RLj.

The pixel PX may include a light emitting element LD, a first transistor T1 (e.g., a driving transistor), a second transistor T2, a third transistor T3, and a storage capacitor Cst. Each of the first transistor T1, the second transistor T2, and the third transistor T3 may be formed of a thin-film transistor including an oxide semiconductor, but is not limited thereto. For example, at least some of the first transistor T1, the second transistor T2, and the third transistor T3 may include a polysilicon semiconductor, or may be implanted as an N-type semiconductor or a P-type semiconductor.

The light emitting element LD may include a first electrode (e.g., an anode electrode) connected to a first power line PL1 via a second node N2 and a first transistor T1, and a second electrode (e.g., a cathode electrode) connected to a second power line PL2. The light emitting element LD may emit light with a luminance corresponding to driving current supplied from the first transistor T1.

An organic light emitting diode may be selected as the light emitting element LD. Furthermore, an inorganic light emitting diode such as a micro light emitting diode (LED) or a quantum dot light emitting diode may be selected as the light emitting element LD. The light emitting element LD may be an element formed of a combination of organic material and inorganic material. Although FIG. 2 illustrates that the pixel PX includes a single light emitting element LD, the pixel PX in accordance with some embodiments may include a plurality of light emitting elements. The plurality of light emitting elements may be connected in series, parallel or series-parallel to each other.

The first transistor T1 may include a first electrode (e.g., a drain electrode) connected to the first power line PL1 to which the first driving power VDD is applied, and a second electrode (e.g., a source electrode) connected to the second node N2. A gate electrode of the first transistor T1 may be connected to a first node N1. The first transistor T1 may control the amount of current flowing to the light emitting element LD in response to the voltage of the first node N1 (e.g., a gate-source voltage applied between the gate electrode and the second electrode of the first transistor).

The second transistor T2 may include a first electrode connected to the data line DLj, and a second electrode connected to the first node N1. A gate electrode of the second transistor T2 may be connected to the first scan line SLi. In examples in which a first scan signal is supplied to the first scan line SLi, the second transistor T2 may be turned on to transmit a data signal VDATA from the data line DLj to the first node N1.

The storage capacitor Cst may be formed or connected between the first node N1 and the second node N2. The storage capacitor Cst may store the voltage of the first node N1.

The third transistor T3 may be connected between the readout line RLj and the second node N2. A gate electrode of the third transistor T3 may be connected to the second scan line SSLi. In examples in which a second scan signal is supplied to the second scan line SSLi, the third transistor T3 may be turned on to transmit the voltage of the initialization power VINT from the readout line RLj to the second node N2.

In examples where the second transistor T2 and the third transistor T3 are concurrently (e.g., simultaneously) turned on in response to the first scan signal and the second scan signal, a voltage difference between the data signal VDATA and the initialization power VINT is stored in the storage capacitor Cst. The first transistor T1 may control the amount of current flowing through the light emitting element LD in response to the voltage difference stored in the storage capacitor Cst.

In contrast, in examples where the third transistor T3 is turned on during the sensing period to connect the second node N2 and the readout line RLj, a sensing signal may be provided from the pixel PX to the readout line RLj.

Figure 3:
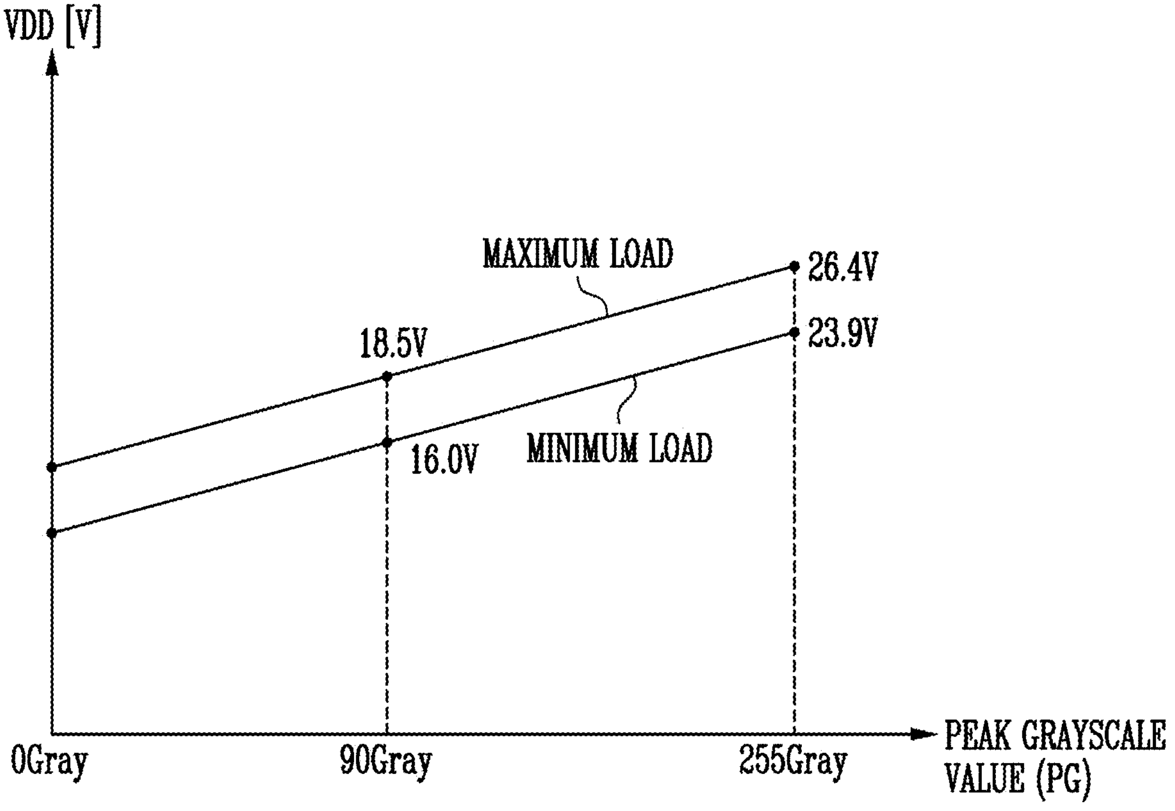
FIG. 3 is a diagram illustrating a first driving power generated in a power generator in response to a voltage code, according to some embodiments of the present disclosure.

FIG. 3 is a diagram illustrating the first driving power VDD generated in the power generator 150 in response to a voltage code Vcode, according to some embodiments of the present disclosure. In FIG. 3, the Y-axis refers to the voltage of the first driving power VDD, and the X-axis refers to the peak grayscale value PG. A minimum load refers to a smallest load that can be applied to the display component 110, while a maximum load refers to a largest load that can be applied to the display component 110.

Referring to FIG. 3, the voltage of the first driving power VDD may be set in response to the load Load and the peak grayscale value PG of the display component 110.

For example, in examples where the load Load of the display component 110 is set to the minimum load and the peak grayscale value PG is 90, the timing controller 140 may supply a voltage code Vcode corresponding to 16.0 V to the power generator 150. In such examples, the power generator 150 may supply the first driving power VDD having a voltage of 16.0 V to the display component 110.

For example, in examples in which the load Load of the display component 110 is set to the maximum load and the peak grayscale value PG is 90, the timing controller 140 may supply a voltage code Vcode corresponding to 18.5 V to the power generator 150. In such examples, the power generator 150 may supply the first driving power VDD having a voltage of 18.5 V to the display component 110.

For example, in examples in which the display component 110 is set to the minimum load or the maximum load and the peak grayscale value PG is 255, the timing controller 140 may supply a voltage code Vcode corresponding to 23.9 V or 26.4 V to the power generator 150. In such examples, the power generator 150 may supply the first driving power VDD having a voltage of 23.9 V or 26.4 V to the display component 110.

In other words, in some embodiments of the present disclosure, the voltage of the first driving power VDD may be set in response to the load Load and peak grayscale value PG of the display component 110. Consequently, the power consumption of the display device 100 may be reduced.

Figure 4A:
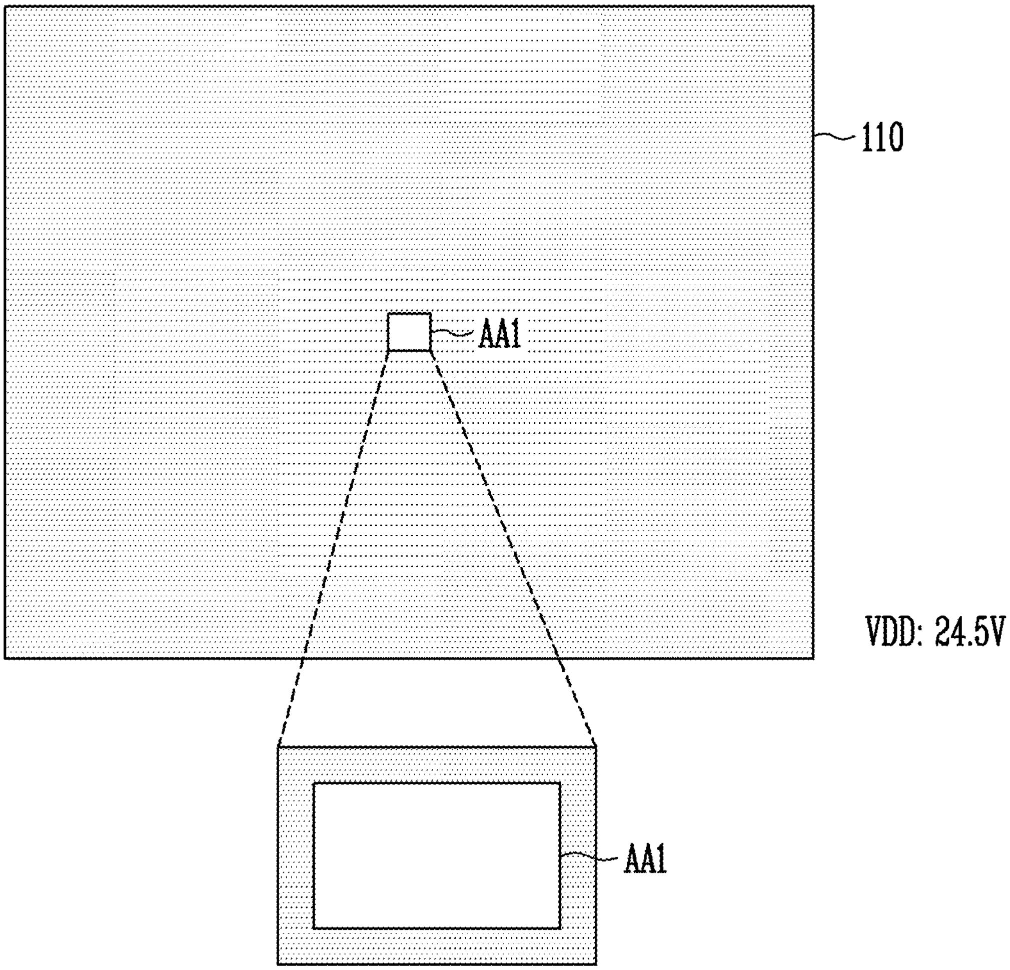
FIGS. 4A and 4B illustrate examples in which a specific pattern is displayed on a display component, according to some embodiments of the present disclosure.
Figure 4B:
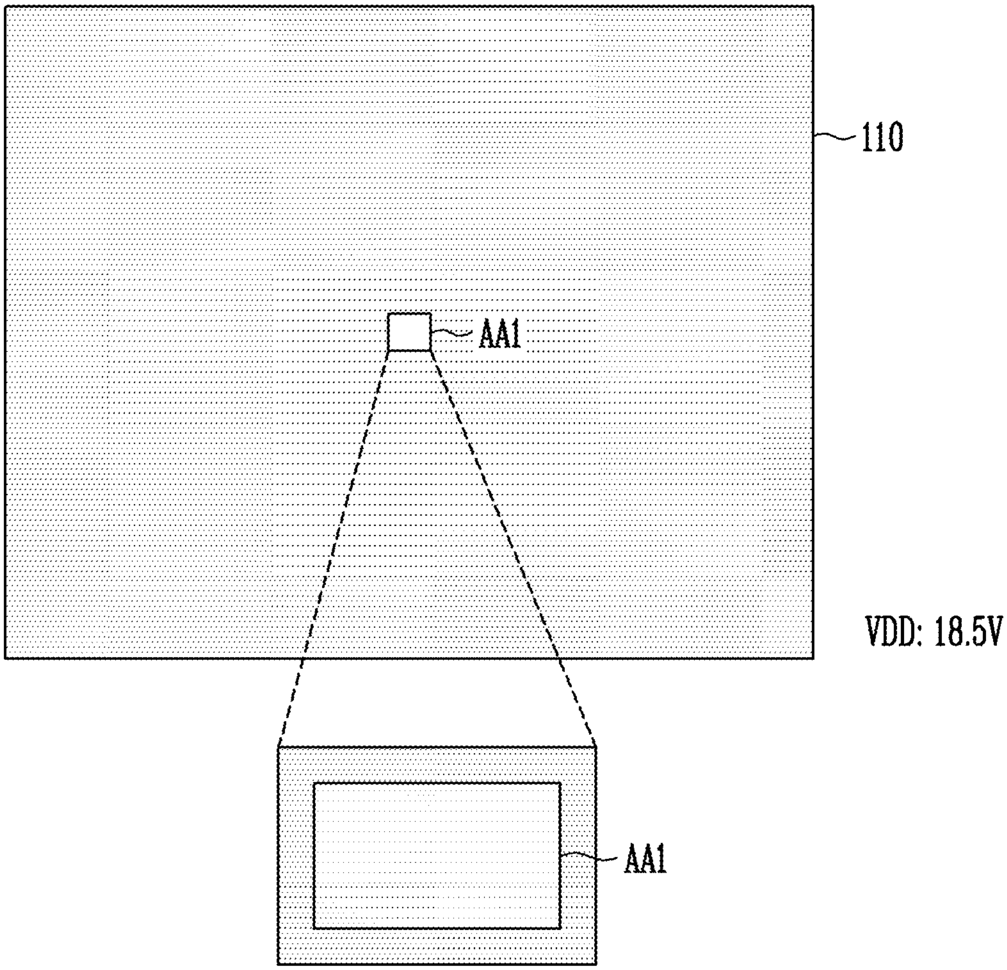

FIGS. 4A and 4B illustrate the example where a specific pattern is displayed on the display component 110, according to some embodiments of the present disclosure. FIGS. 4A and 4B illustrate examples in which most areas of the display component 110 display images of a low grayscale value (e.g., grayscale value 90), and a specific area AA1 displays an image of a high grayscale value (e.g., grayscale value 255). Here, the proportion of the most areas may be set to 99.99% of the display component 110, and the proportion of the specific area AA1 may be set to 0.01% of the display component 110. In other words, the area of the display component 110 displaying images of a low grayscale value my constitute 99.99% of the total area of display component 110, and the specific area AA1 may constitute 0.01% of the total area of display component 110.

Referring to FIG. 4A, the timing controller 140 may generate a voltage code Vcode corresponding to the load Load and the peak grayscale value PG of the display component 110. Here, in examples in which the peak grayscale value PG has a relatively high value even if most areas of the display component 110 display images with a low grayscale value, the timing controller 140 may generate a voltage code Vcode so that the power generator 150 generates the first driving power VDD having a relatively high voltage. For example, in examples of FIG. 4A, the voltage of the first driving power VDD may be set to 24.5 V, and the current of the first driving power VDD may be set to 21 A. In such examples, the power consumption for driving the display component 110 may be set to 514.5 W.

Here, as illustrated in FIG. 4B, the voltage of the first driving power supply VDD may be reduced within a range in which a reduction in grayscale value of the specific area AA1 displaying an image with a high grayscale value is not perceptible to the user. For example, in examples in which the voltage of the first driving power VDD may be set to 18.5 V and the current of the first driving power VDD is set to 21 A, the power consumption can be reduced without a reduction in luminance of the specific area AA1 being perceptible to the user. In examples in which the voltage of the first driving power VDD is set to 18.5 V, the power consumption for driving the display component 110 may be set to 388.5 V.

In some embodiments of the present disclosure, in examples in which the voltage of the first driving power VDD is set in response to the load Load and the peak grayscale value PG of the display component 110, and the display component 110 displays a static image, the voltage of the first driving power VDD may be further reduced/decreased, thereby further reducing the power consumption of the display device 100.

Figure 5:
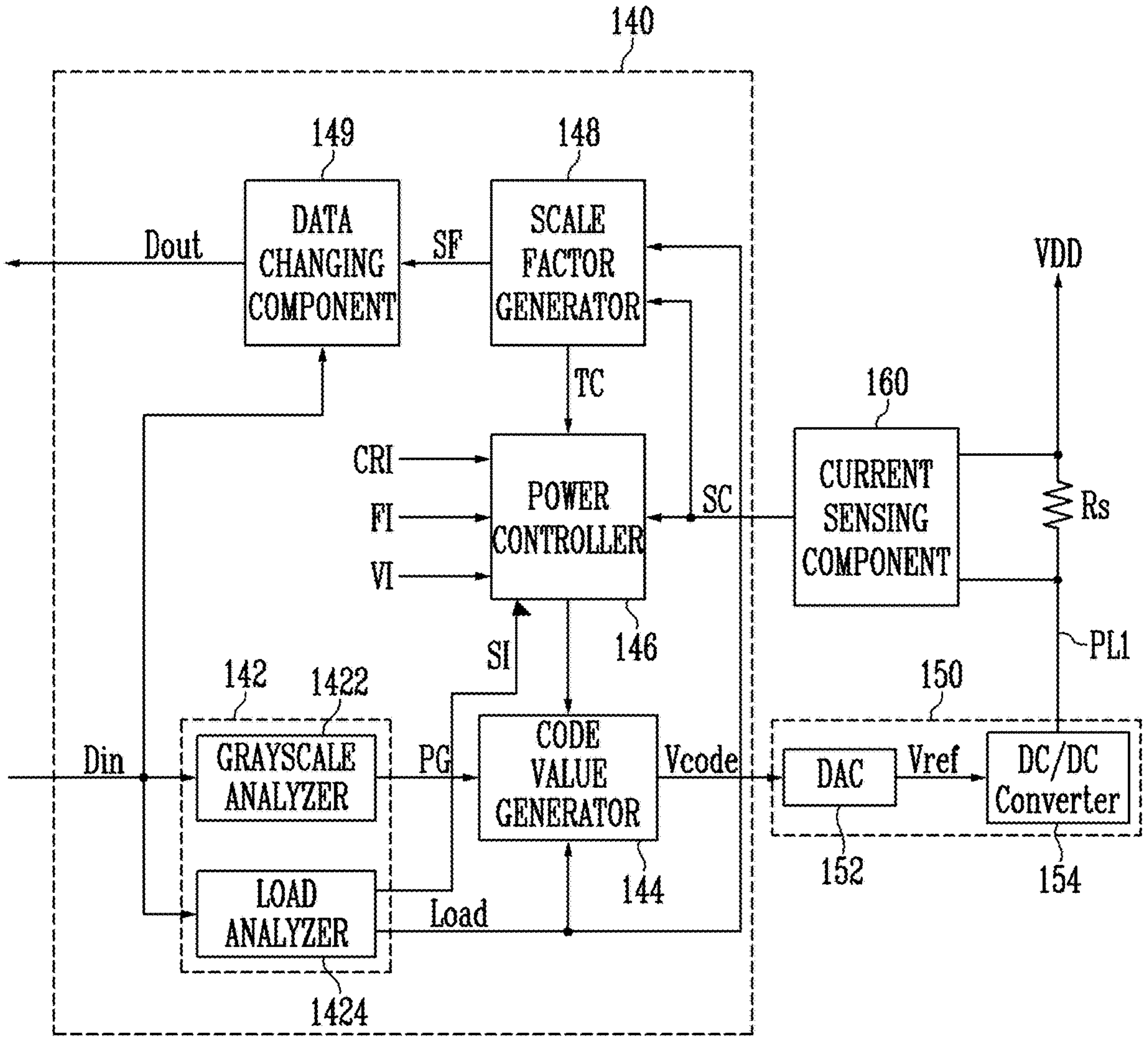
FIG. 5 is a diagram illustrating a timing controller and a power generator in accordance with some embodiments of the present disclosure.

FIG. 5 is a diagram illustrating the timing controller and the power generator in accordance with some embodiments of the present disclosure.

Referring to FIG. 5, the power generator 150 in accordance with some embodiments of the present disclosure may include a digital to analog converter (DAC) 152, and a DC-DC converter 154.

The DAC 152 may generate a reference voltage Vref (e.g., a feedback voltage) corresponding to the voltage code Vcode, and supply the reference voltage Vref to the DC-DC converter 154. For example, the DAC 152 may supply the reference voltage Vref ranging from 0 V to 3.3 V (or up to a maximum of 4.8 V) in response to the voltage code Vcode to the DC-DC converter 154.

The DC-DC converter 154 may generate first driving power VDD of a certain voltage based on the reference voltage Vref and supply the first driving power VDD to the first power line PL1. The voltage of the first driving power VDD generated from the DC-DC converter 154 may be determined based on the voltage (i.e., the voltage code Vcode) of the reference power Vref.

The timing controller 140 in accordance with some embodiments of the present disclosure may include an analyzer 142, a code value generator 144, a power controller 146, a scale factor generator 148, and a data changing component 149. Although various additional components may be included in the timing controller 140, FIG. 5 illustrates only some components (142, 144, 146, 148, and 149) for the sake of convenience of explanation.

The scale factor generator 148 may be supplied with sensing current SC from the current sensing component 160. Furthermore, the scale factor generator 148 may be supplied with a load Load corresponding to input data Din from the analyzer 142. The scale factor generator 148 supplied with the sensing current SC may generate a scale factor SF to make the target current TC and the sensing current SC equal.

The target current TC may be set in response to the load Load of the input data Din, and may correspond to a current value to be supplied from the first driving power VDD to the display component 110 in response to the load Load. The sensing current SC may correspond to an actual current value supplied from the first driving power VDD to the display component 110. The scale factor generator 148 may generate a scale factor SF such that the sensing current SC becomes equal to the target current TC.

The data changing component 149 may receive the scale factor SF and the input data Din. The data changing component 149 may generate output data Dout by reflecting the scale factor SF in the input data Din. The output data Dout may have a bit value set such that the sensing current SC is equal to the target current TC.

In examples in which the scale factor SF is reflected to generate the output data Dout, the current value of the first driving power VDD may remain approximately constant even if the temperature of the display component 110 changes. In such examples, the luminance of the display component 110 may remain uniform or substantially uniform regardless of the temperature of the display component 110.

The analyzer 142 may calculate (or analyze) a load Load of the input data Din, or may extract a peak grayscale value (or maximum grayscale value) PG. Furthermore, the analyzer 142 may determine whether a static image is displayed on the display component 110. To this end, the analyzer 142 may include a grayscale analyzer 1422 and a load analyzer 1424.

The grayscale analyzer 1422 may extract the peak grayscale value PG from the input data Din of one frame. Here, the peak grayscale value PG may refer to a highest grayscale value in the input data Din included in one frame.

The load analyzer 1424 may calculate the load Load of the input data Din corresponding to one frame. For example, the load analyzer 1424 may calculate the load Load by averaging grayscale values of the input data Din of one frame. Various known methods may be used as a method of calculating the load Load by the load analyzer 1424.

In addition, the load analyzer 1424 may use the input data Din inputted on a frame basis to determine whether a static image is displayed on the display component 110. In examples in which the static image is displayed on the display component 110, the load analyzer 1424 may supply a static image signal SI to the power controller 146.

The code value generator 144 may generate a voltage code Vcode in response to the peak grayscale value PG and the load Load, and supply the generated voltage code Vcode to the power generator 150.

The power controller 146 may receive sensing current SC from the current sensing component 160, a static image signal SI from the load analyzer 142, and target current TC form the scale factor generator 148. The power controller 146 may receive current reduction information CRI, frame information FI, and voltage information VI from an external device (e.g., an application processor or the like).

The power controller 146 may reduce the voltage of the first driving power VDD by controlling the code value generator 144 when the static image signal SI is inputted (or when a static image is displayed on the display component 110). Further detailed description pertaining to the foregoing will be provided later herein.

Figure 6:
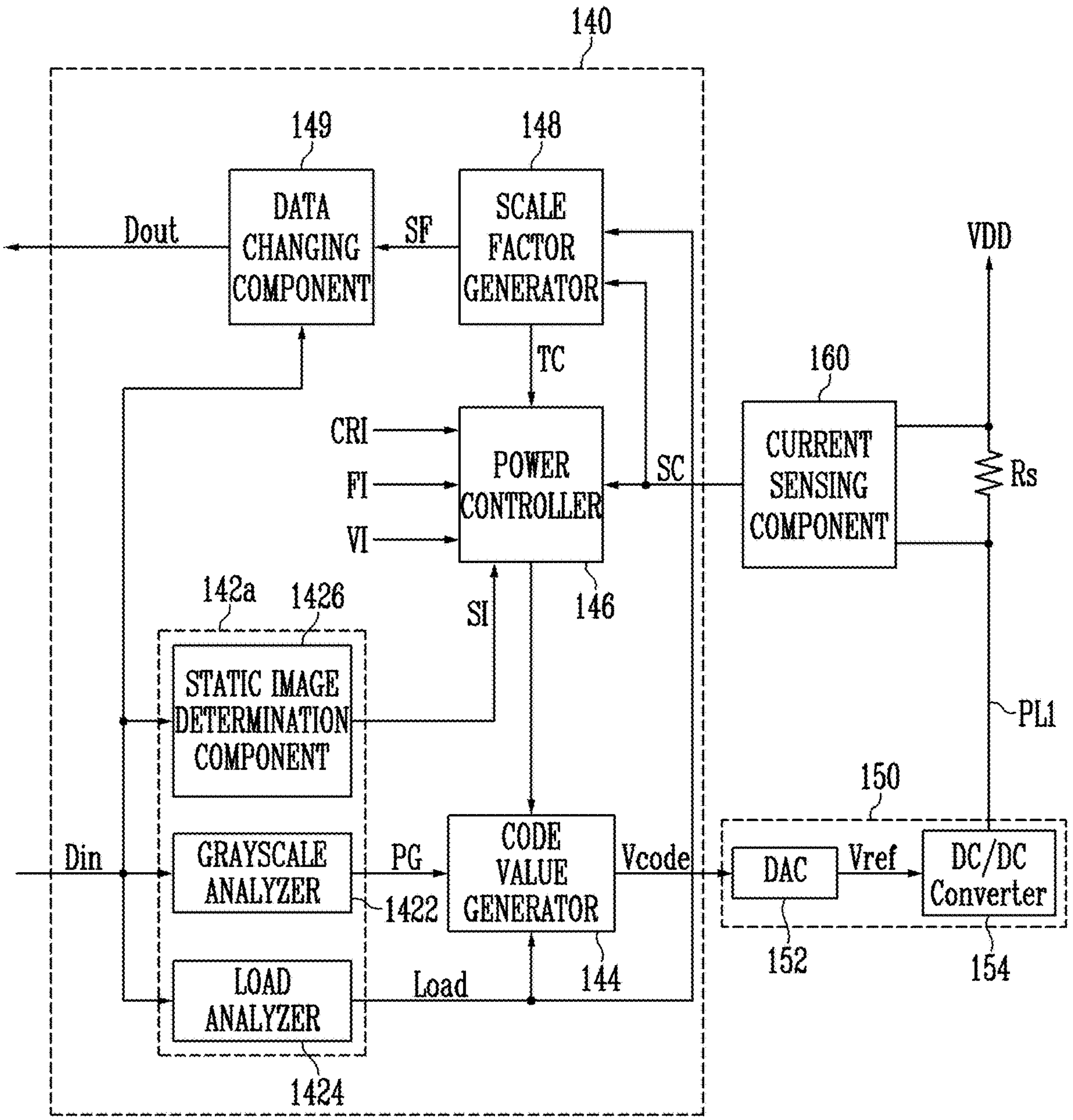
FIG. 6 is a diagram illustrating a timing controller and a power generator in accordance with some embodiments of the present disclosure.

FIG. 6 is a diagram illustrating the timing controller 140 and the power generator 150 in accordance with some embodiments of the present disclosure. In the following description of FIG. 6, redundant explanation pertaining to the same configuration as that of FIG. 5 may be omitted.

Referring to FIG. 6, the timing controller 140 in accordance with some embodiments of the present disclosure may include an analyzer 142*a,* a code value generator 144, a power controller 146, a scale factor generator 148, and a data changing component 149.

The analyzer 142*a* may calculate (or analyze) a load Load of the input data Din, or may extract a peak grayscale value (or maximum grayscale value) PG. Furthermore, the analyzer 142*a* may determine whether a static image is displayed on the display component 110. To this end, the analyzer 142*a* may include a grayscale analyzer 1422, a load analyzer 1424, and a static image determination component 1426.

The static image determination component 1426 may use the input data Din inputted on a frame basis to determine whether a static image is displayed on the display component 110. In examples in which the static image is displayed on the display component 110, the static image determination component 1426 may supply a static image signal SI to the power controller 146.

Figure 7A:
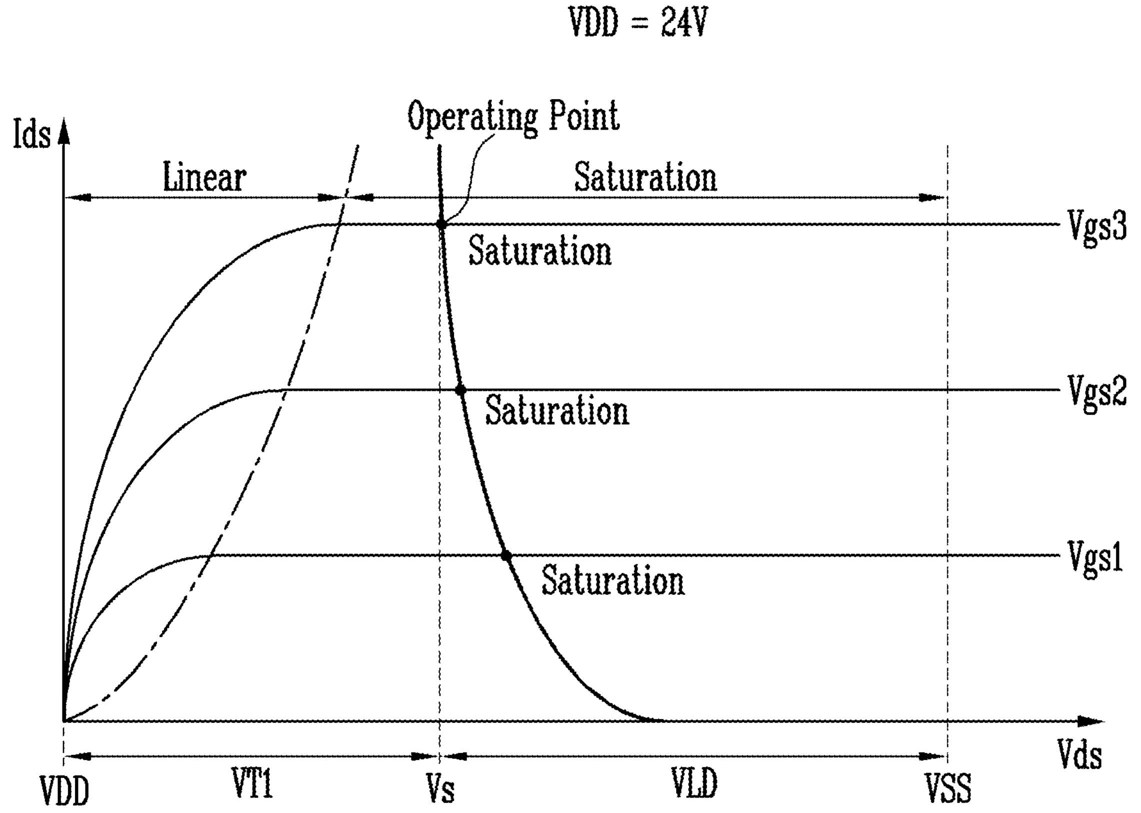
FIGS. 7A and 7B are diagrams illustrating a change in operating point of a first transistor in response to a voltage of first driving power, according to some embodiments of the present disclosure.
Figure 7B:
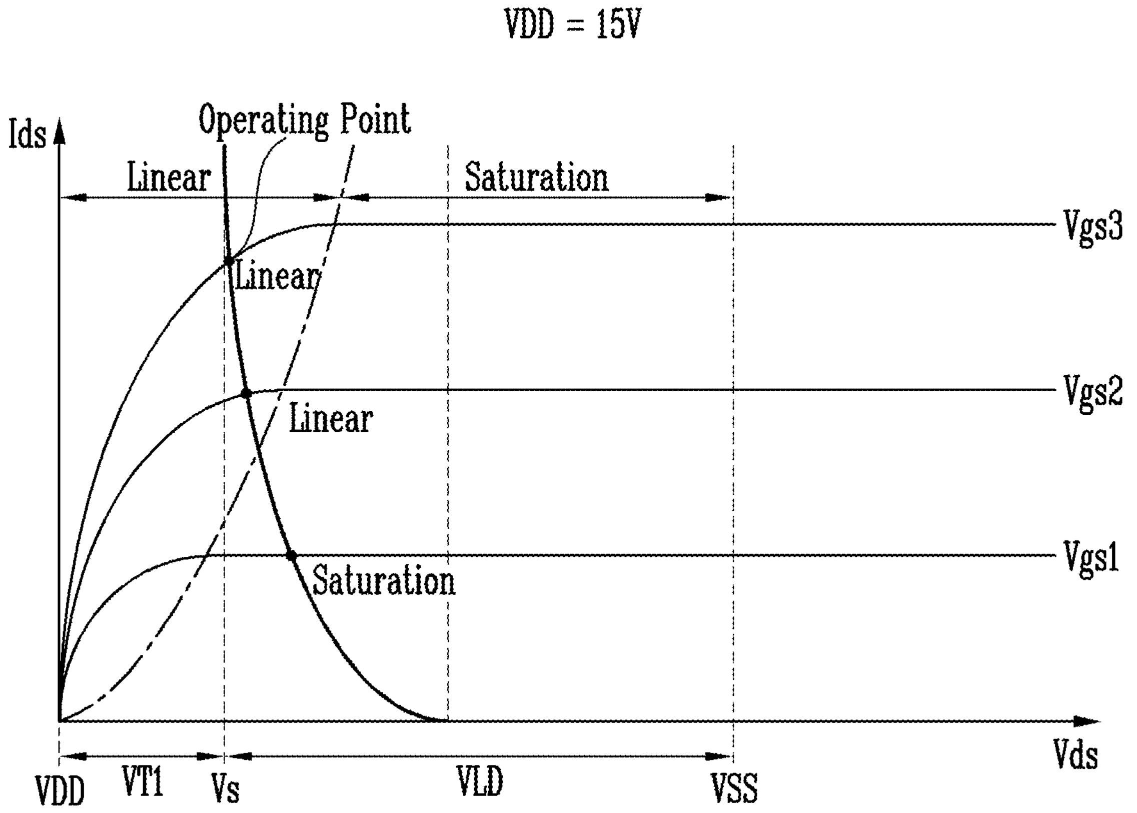

FIGS. 7A and 7B are diagrams illustrating a change in the operating point of the first transistor T1 in response to the voltage of the first driving power VDD, according to some embodiments of the present disclosure. In FIGS. 7A and 7B, Ids, which represents the Y-axis of the diagrams of FIGS. 7A and 7B, may refer to the driving current of the first transistor T1, and Vds, which represents the X-axis of the diagrams of FIGS. 7A and 7B, may refer to a voltage between the drain electrode and the source electrode of the first transistor. In FIGS. 7A and 7B, VT1 may denote a voltage between the second node N2 and the first power line PL1, VLD may denote a voltage between the second node N2 and the second power line PL2, and Vs may denote a voltage of the second node N2. In FIGS. 7A and 7B, Vgs3, Vgs2, and Vgs1 may denote voltages between the first node N1 and the second node N2. In examples in which a voltage of a data signal corresponding to a high grayscale value is supplied to the pixel PX, a voltage corresponding to Vgs3 may be stored in the storage capacitor Cst. In examples in which a voltage of a data signal corresponding to a middle grayscale value is supplied to the pixel PX, a voltage corresponding to Vgs2 (a voltage lower than Vgs3) may be stored in the storage capacitor Cst. In examples in which a voltage of a data signal corresponding to a low grayscale value is supplied to the pixel PX, a voltage corresponding to Vgs1 (a voltage lower than Vgs2) may be stored in the storage capacitor Cst.

Referring to FIG. 7A, in examples in which the first driving power VDD is set to 24 V, the first transistor T1 may be driven in a saturation area regardless of the grayscale value (e.g., a high, middle, or low grayscale value).

Referring to FIG. 7B, in examples in which the first driving power VDD is set to 15 V, the first transistor T1 may be driven in a linear region (e.g., a linear area) at a high or middle grayscale value, and the first transistor T1 may be driven in a saturation area at a low grayscale value. In examples in which the first transistor T1 is driven in the linear region, the driving current may be reduced.

As described above, in examples in which the voltage of the first driving power VDD is set to a relatively low value, the first transistor T1 included in the pixel PX may be driven in the linear region. Here, in examples in which voltage of the first driving power VDD is set to an excessively low value, the driving current of the first transistor T1 may be significantly reduced. In some embodiments of the present disclosure, the voltage of the first driving power VDD may be reduced by the power controller 146 within a range in which a reduction in luminance is not perceptible to the user. In other words, the power controller 146 may control the voltage value of the first driving power VDD such that a reduction in luminance due to the reduction in driving current is not perceivable to the user.

Figure 8:
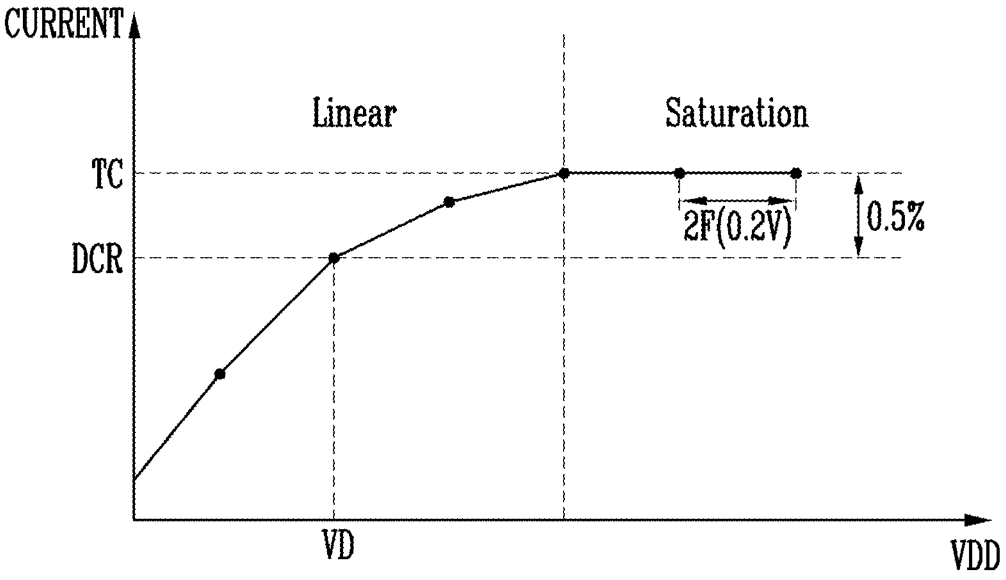
FIG. 8 is a diagram illustrating an operation process of a power controller, according to some embodiments of the present disclosure.

FIG. 8 is a diagram illustrating an operation process of the power controller 146, according to some embodiments of the present disclosure.

Referring to FIGS. 5 and 8, the power controller 146 may receive sensing current SC, a static image signal SI, target current TC, current reduction information CRI, frame information FI, and voltage information VI.

The current reduction information CRI may include information (e.g., first desired current value information) about a current value of the first driving power VDD that is allowed to be reduced based on the target current TC. For example, the current reduction information CRI may have a certain percentage (%) value. For example, in examples in which the current reduction information CRI is set to 0.5%, current reduced from the target current TC by 0.5% may be set to desired current DCR (e.g., a first desired current value). The desired current DCR may be current reduced from the target current TC by a certain percentage (%), and may be experimentally determined such that a reduction in luminance is not perceivable to the user even when the voltage of the first driving power VDD is reduced to ensure that the desired current DCR flows.

The frame information FI may include information about a certain frame. The power controller 146 may reduce the voltage of the first driving power VDD in stages for each certain frame. For example, in examples in which the frame information FI includes two frames, the power controller 146 may reduce the voltage of the first driving power VDD every two frames.

The voltage information VI may include information about a certain voltage. The power controller 146 may reduce the voltage of the first driving power VDD by the certain voltage. For example, in examples in which the voltage information VI includes voltage information of 0.2 V, the power controller 146 may reduce the voltage of the first driving power VDD by 0.2 V.

For example, the power controller 146 may control the code value generator 144 such that the voltage of the first driving power VDD decreases by 0.2 V every two frames in response to the frame information FI and the voltage information VI. In such examples, the code value generator 144 may generate the voltage code Vcode such that the voltage of the first driving power VDD decreases by 0.2 V every two frames. The power controller 146 may control the code value generator 144 such that the voltage of the first driving power VDD decreases until the sensing current SC has approximately the same value as the desired current DCR.

The operation process will be described. The power controller 146 may not be driven when no static image signal SI is inputted. The voltage of the first driving power VDD may be determined in response to the load Load and the peak grayscale value PG.

In examples in which the static image is displayed on the display component 110, a static image signal SI may be supplied from the load analyzer 1424 or the static image determination component 1426 to the power controller 146. In examples in which the static image signal SI is inputted, the power controller 146 may be driven. Hereinafter, a period during which the power controller 146 is driven will be referred to as a voltage adjustment period.

During the voltage adjustment period, the scale factor generator 148 may maintain the scale factor SF at a constant value. In other words, the scale factor generator 148 may not change the scale factor SF even if the sensing current SC and the target current TC have different values during the voltage adjustment period.

In examples in which the static image signal SI is inputted, the power controller 146 may set the desired current DCR by reflecting a percentage (%) value (e.g., 0.5%) of the current reduction information CRI in the target current TC supplied from the scale factor generator 148.

The power controller 146 that has set the desired current DCR may control the code value generator 144 such that the first driving power VDD decreases by a certain voltage for each certain frame, in response to the frame information FI and the voltage information VI. In such examples, the code value generator 144 may generate a voltage code Vcode such that the first driving power VDD decreases by a certain voltage for each certain frame, and may supply the generated voltage code Vcode to the power generator 150.

The power generator 150 may reduce the voltage of the first driving power VDD by a certain voltage for each certain frame in response to the voltage code Vcode. For example, as illustrated in FIG. 8, the voltage of the first driving power VDD may decrease by 0.2 V every two frames 2F.

The current sensing component 160 may sense sensing current SC flowing through the sensing resistor Rs during the voltage adjustment period, and supply the sensed sensing current SC to the power controller 146. The power controller 146 may control the code value generator 144 such that the voltage of the first driving power VDD decreases until the sensing current SC becomes approximately equal (or similar) to the desired current DCR.

In examples in which the sensing current SC is approximately equal (or similar) to the desired current DCR, the power controller 146 may determine that the voltage of the first driving power VDD has been set to a desired voltage VD. In examples in which the voltage of the first driving power VDD is set to the desired voltage VD, the power controller 146 may control the code value generator 144 such that the voltage of the first driving power VDD is maintained at the desired voltage VD. In such examples, the code value generator 144 may maintain the voltage code Vcode at a constant value corresponding to the desired voltage VD.

In examples in which the voltage of the first driving power VDD is set to the desired voltage VD, the voltage adjustment period may be terminated. In examples in which the voltage adjustment period is terminated, the scale factor generator 148 may change the scale factor SF such that the sensing current SC is equal to the target current TC. As a result, deterioration in luminance of the pixel PX corresponding to a reduction in voltage of the first driving power VDD may be partially compensated for.

For example, when an initial static image is displayed on the display component 110, the voltage of the first driving power VDD may be set to 26.4V, and the current of the first driving power VDD may be set to 21 A. In such examples, the power consumption of the display component 110 may be 554.4 W.

For instance, in examples in which the power controller 146 reduces the voltage of the first driving power VDD to the desired voltage VD, the voltage of the first driving power VDD is set to 24 V, and the current of the first driving power VDD may be set to 21 A. In such examples, the power consumption of the display component 110 may be 504 W.

In other words, in some embodiments of the present disclosure, the voltage of the first driving power VDD may be reduced when a static image is displayed on the display component 110, the power consumption of the display device 100 can be reduced.

Furthermore, in examples in which the voltage of the first driving power VDD is set to the desired voltage VD, the first transistor T1 included in at least one pixel PX among the pixels PX included in the display component 110 may be driven in the linear region.

Figure 9:
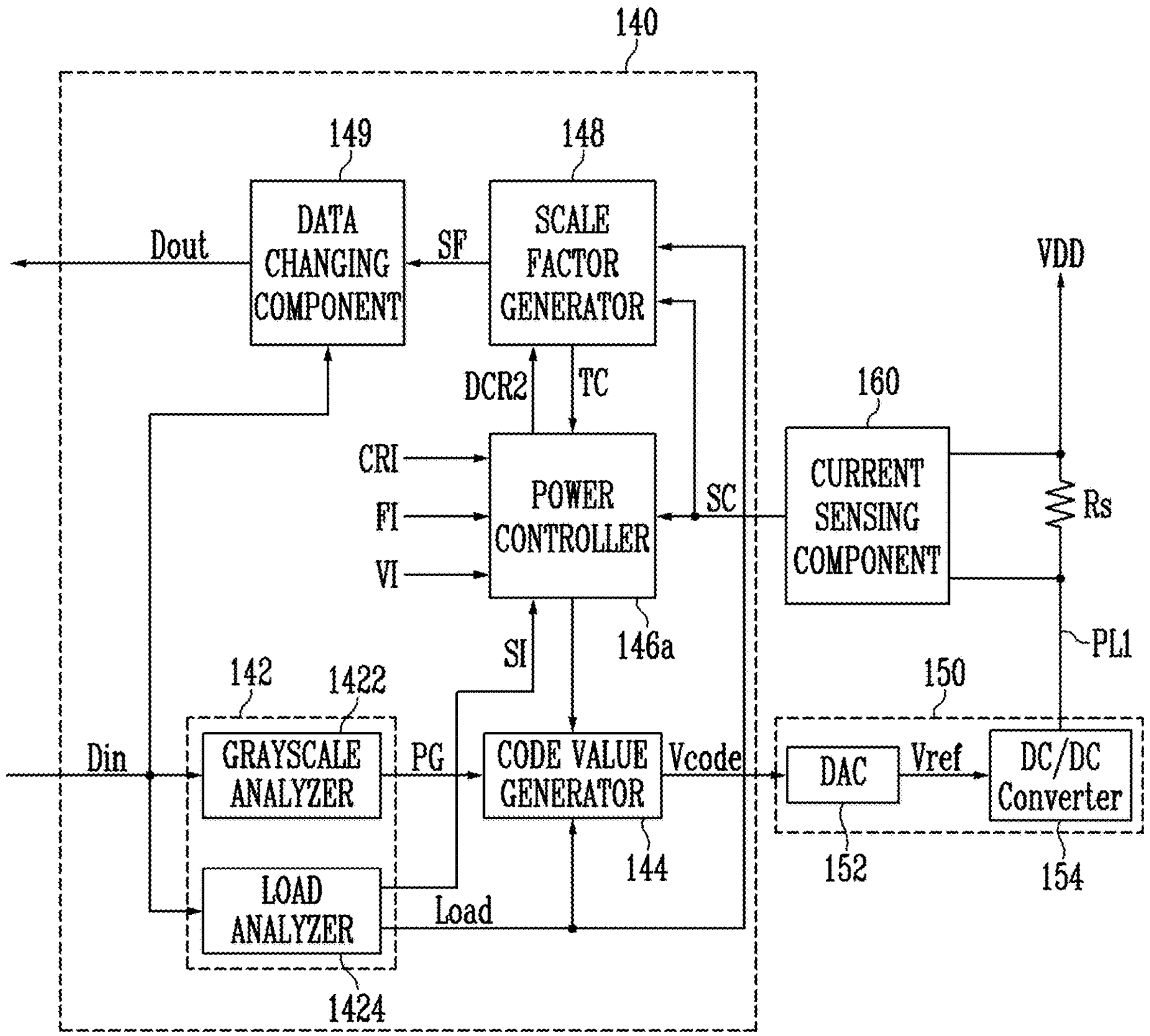
FIG. 9 is a diagram illustrating a timing controller and a power generator in accordance with some embodiments of the present disclosure.

FIG. 9 is a diagram illustrating a timing controller 140 and a power generator 150 in accordance with some embodiments of the present disclosure. In the following description of FIG. 9, redundant explanation pertaining to the same configuration as that of FIG. 5 may be omitted.

Referring to FIG. 9, the timing controller 140 in accordance with some embodiments of the present disclosure may include an analyzer 142, a code value generator 144, a power controller 146*a,* a scale factor generator 148, and a data changing component 149.

The power controller 146*a* may receive sensing current SC from the current sensing component 160, a static image signal SI from the load analyzer 1424, and target current TC form the scale factor generator 148. The power controller 146*a* may receive current reduction information CRI, frame information FI, and voltage information VI from an external device (e.g., an application processor or the like).

The power controller 146*a* may supply second desired current DCR2 (e.g., a second desired current value) to the scale factor generator 148. The second desired current DCR2 may be set by reflecting a certain percentage (%) value in the target current TC. The second desired current DCR2 may have a relatively high value (e.g., a relatively high current value) compared to the target current TC.

Figure 10A:
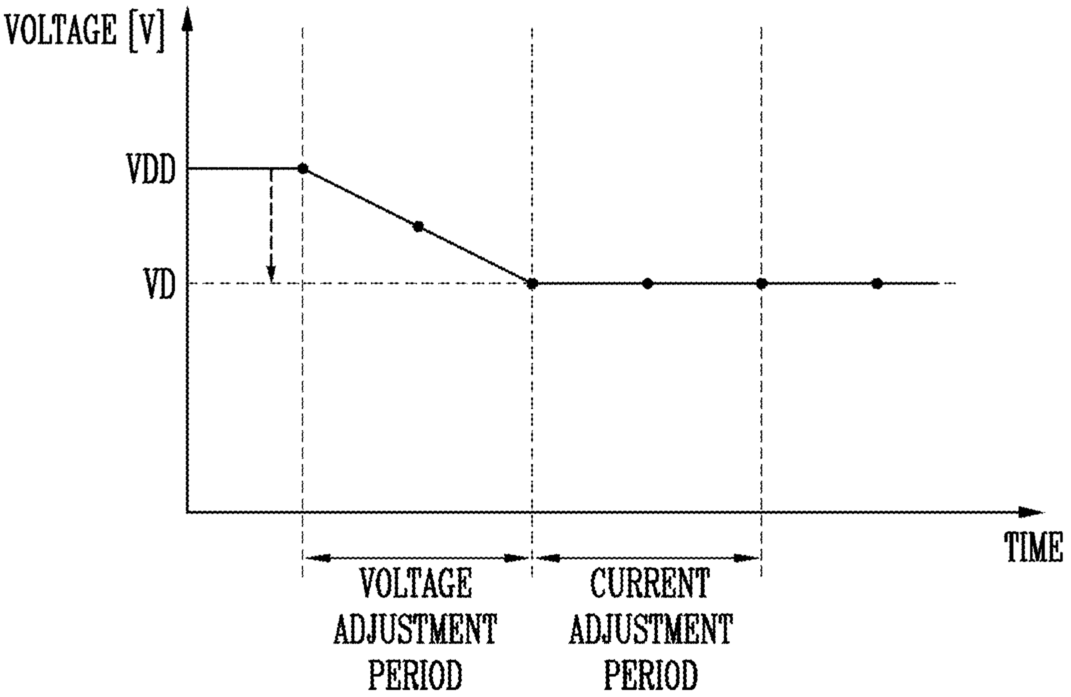
FIGS. 10A and 10B are diagrams illustrating an operation process of the power controller of FIG. 9, according to some embodiments of the present disclosure.
Figure 10B:
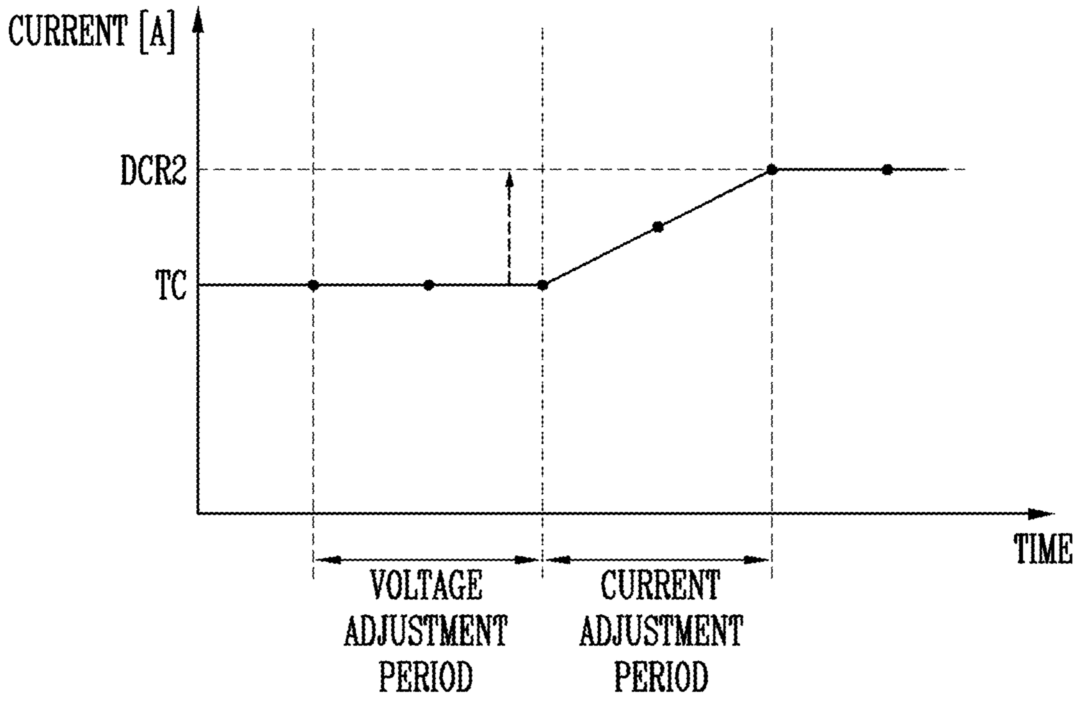

FIGS. 10A and 10B are diagrams illustrating an operation process of the power controller 146*a* of FIG. 9, according to some embodiments of the present disclosure.

Referring to FIGS. 8, 10A, and 10B, in examples in which a static image is displayed on the display component 110, a static image signal SI may be supplied to the power controller 146*a*. In examples in which the static image signal SI is inputted to the power controller 146*a,* the power controller 146*a* may control the code value generator 144, thereby reducing the voltage of the first driving power VDD.

In some embodiments, during the voltage adjustment period, the power controller 146*a* may control the code value generator 144 such that the first driving power VDD decreases by a certain voltage for each certain frame, in response to the frame information FI and the voltage information VI. In such examples, the code value generator 144 may generate a voltage code Vcode such that the first driving power VDD decreases by a certain voltage for each certain frame, and may supply the generated voltage code Vcode to the power generator 150.

The current sensing component 160 may sense sensing current SC flowing through the sensing resistor Rs during the voltage adjustment period, and supply the sensed sensing current SC to the power controller 146*a*. The power controller 146*a* may reduce the voltage of the first driving power VDD such that the sensing current SC becomes equal (substantially similar) to first desired current DCR.

In such examples, during the voltage adjustment period, the current of the first driving power VDD may gradually decrease from the target current TC to the first desired current DCR. However, since a difference in value between the target current TC and the first desired current DCR is not significant, FIG. 10B illustrates that the target current TC is maintained during the voltage adjustment period.

In examples in which the sensing current SC is equal (substantially similar) to the first desired current DCR, the power controller 146*a* may determine that the voltage of the first driving power VDD has been set to the desired voltage VD. In examples in which the voltage of the first driving power VDD is set to the desired voltage VD, the power controller 146*a* may control the code value generator 144 such that the voltage of the first driving power VDD is maintained at the desired voltage VD. In such examples, the code value generator 144 may maintain the voltage code Vcode at a constant value corresponding to the desired voltage VD.

In examples in which the voltage of the first driving power VDD is set to the desired voltage VD, the voltage adjustment period may be terminated. In examples in which the voltage adjustment period is terminated, the scale factor generator 148 may change the scale factor SF such that the sensing current SC is equal to the target current TC. As a result, deterioration in luminance of the pixel PX corresponding to a reduction in voltage of the first driving power VDD may be partially compensated for.

For example, before the voltage adjustment period, the voltage of the first driving power VDD may be set to 27 V, and the current of the first driving power VDD may be set to 21 A. In such examples, the power consumption of the display component 110 may be 567 W.

For example, after the voltage adjustment period, the voltage of the first driving power VDD may be set to 25 V, and the current of the first driving power VDD may be set to 21 A. In such examples, the power consumption of the display component 110 may be 522 W. In other words, in response to the reduction in the voltage of the first driving power VDD, the power consumption of the display component 110 may decrease by first power consumption (45W).

Thereafter, the scale factor generator 148 may change the scale factor SF to enable the second desired current DCR2 to flow through the first driving power VDD. A period in which the scale factor SF is changed to allow the second desired current DCR2 to flow after the voltage adjustment period may be referred to as a current adjustment period.

In examples in which the scale factor SF is controlled during the current adjustment period, the current of the first driving power VDD may increase to the second desired current DCR2. During the current adjustment period, the scale factor generator 148 may gradually increase the current of the first driving power VDD on a certain frame basis and a certain current frame.

For example, the data changing component 149 may generate output data Dout by reflecting the scale factor SF in the input data Din (or by changing the input data Din). As a result, in response to the output data Dout, the current of the first driving power VDD may increase to the second desired current DCR2.

The second desired current DCR2 may be set such that the power consumption increases by the first power consumption (e.g., 45W), or becomes equal to the power consumption before the voltage adjustment period. For example, the second target desired DCR2 may be set to 22.7 A. Therefore, after the current adjustment period, the voltage of the first driving power VDD may be set to 25 V, and the current of the first driving power VDD may be set to 22.7 A. Accordingly, the power consumption of the display component 110 may be set to 567 W.

In such examples, compared to before the voltage adjustment period, the current of the first driving power VDD may increase by 1.7 A while the power consumption remains the same. In examples in which the current of the first driving power VDD increases, the luminance of the display component 110 may increase.

For instance, in examples in which an image as shown in FIG. 4A is displayed on the display component 110, the luminance of the specific area AA1 may be 1000 nits before the voltage adjustment period. The luminance of the specific area AA1 after the current adjustment period may be 1100 nits in response to the second desired current DCR2. In other words, in some embodiments of the present disclosure, the luminance of the display component 110 may be increased while the power consumption remains constant.

Figure 11:
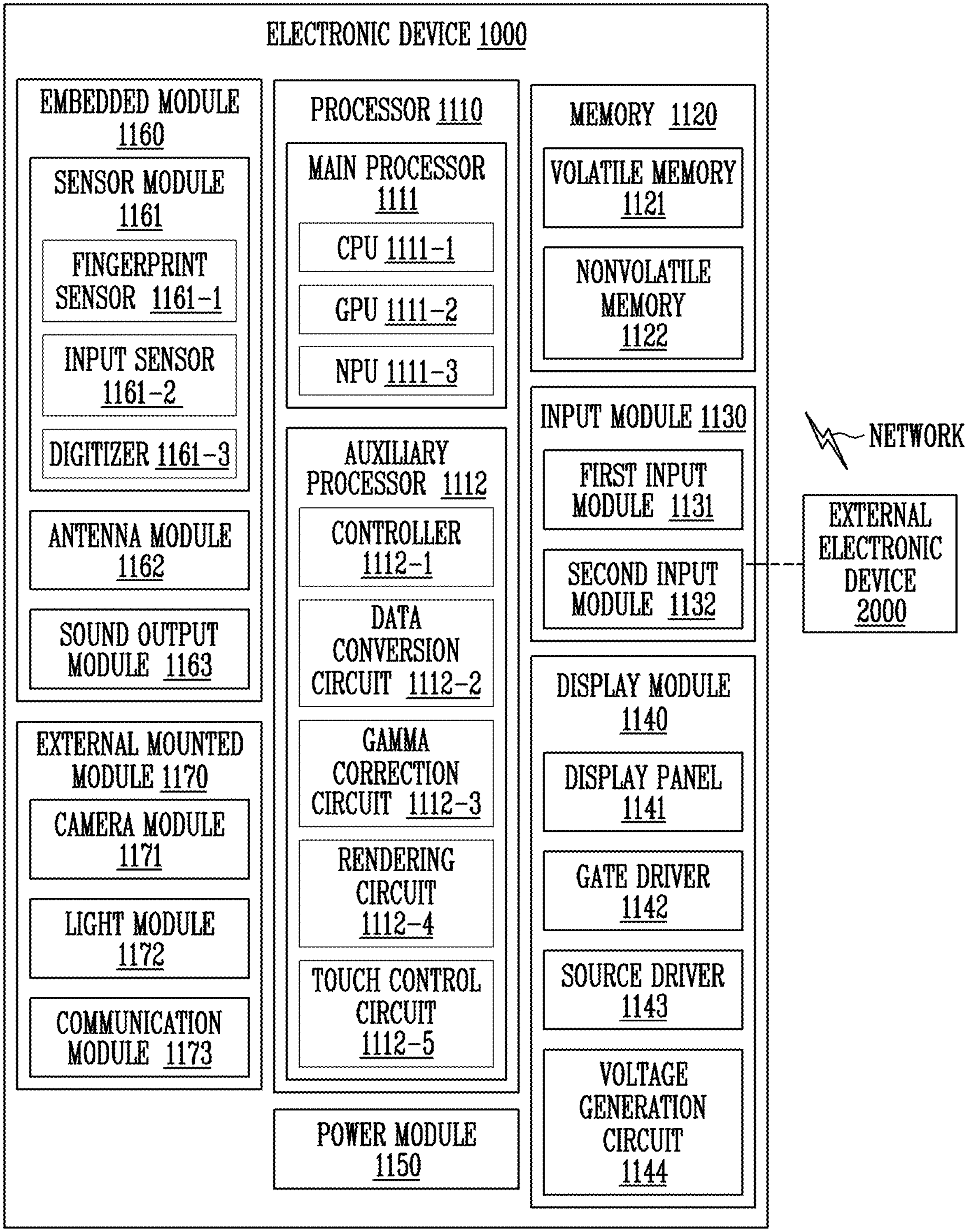
FIG. 11 is a diagram illustrating an electronic device in accordance with some embodiments of the present disclosure.

FIG. 11 is a diagram illustrating an electronic device 1000 in accordance with some embodiments of the present disclosure.

Referring to FIG. 11, the electronic device 1000 in accordance with some embodiments of the present disclosure may output a variety of information through a display module 1140. If a processor 1110 executes an application stored in a memory 1120, the display module 1140 may provide application information to the user through a display panel 1141.

The processor 1110 may acquire an external input through an input module 1130 or a sensor module 1161, and execute an application corresponding to the external input. For example, in examples in which the user selects a camera icon (e.g., a camera application icon) displayed on the display panel 1141, the processor 1110 may acquire a user input through an input sensor 1161-2, and activate a camera module 1171. The processor 1110 may transmit image data corresponding to an image captured by the camera module 1171 to the display module 1140. The display module 1140 may display, on the display panel 1141, an image corresponding to the captured image.

As another example, in examples in which personal information authentication is executed through the display module 1140, a fingerprint sensor 1161-1 may acquire inputted fingerprint information as input data. The processor 1110 may compare input data acquired through the fingerprint sensor 1161-1 with authentication data stored in the memory 1120, and may execute an application depending on a result of the comparison. The display module 1140 may display, on the display panel 1141, information executed according to the logic of the application. The fingerprint sensor 1161-1 may be disposed to make it possible to acquire fingerprint information in the overall area of the display module 1140 (e.g., the display panel 1141).

As another example, in examples in which a music streaming icon displayed on the display module 1140 is selected, the processor 1110 may acquire a user input through the input sensor 1161-2, and activate a music streaming application stored in the memory 1120. If a music playing command is inputted in the music streaming application, the processor 1110 may activate a sound output module 1163 and provide sound information corresponding to the music playing command to the user.

Hitherto, a brief description of the operation of the electronic device 1000 has been provided. Hereinafter, the configuration of the electronic device 1000 will be described in detail. Some of the components of the electronic device 1000 to be described below may be integrated into a single component, or one component may be separated into two or more components.

The electronic device 1000 may communicate with an external electronic device 2000 through a network (e.g., a short-range wireless communication network or a long-range wireless communication network). In some embodiments, the electronic device 1000 may include a processor 1110, a memory 1120, an input module 1130, a display module 1140, a power module 1150, an embedded module 1160, and an external mounted module 1170. In some embodiments, in the electronic device 1000, at least one of the foregoing components may be omitted, or one or more other components may be added. In some embodiments, some components (e.g., the sensor module 1161, an antenna module 1162, or the sound output module 1163) among the foregoing components may be integrated into another component (e.g., the display module 1140).

The processor 1110 may execute software to control at least one other component (e.g., a hardware or software component) of the electronic device 1000 connected to the processor 1110 and perform various data processing or computing operations. In some embodiments, as at least a portion of a data processing or computing operation, the processor 1110 may store a command or data received from another component (e.g., the input module 1130, the sensor module 1161, or a communication module 1173) in a volatile memory 1121, process the command or data stored in the volatile memory 1121, and store result data in a nonvolatile memory 1122.

The processor 1110 may include a main processor 1111 and an auxiliary processor 1112. The main processor 1111 may include a central processing unit (CPU) 1111-1. The main processor 1111 may further include any one or more of a graphic processing unit (GPU) 1111-2, a communication processor (CP), and an image signal processor (ISP). The main processor 1111 may further include a neural processing unit (NPU) 1111-3. The NPU 1111-3 may be a processor specialized to process an artificial intelligence model. The artificial intelligence model may be generated by machine learning. The artificial intelligence model may include a plurality of artificial neural network layers. An artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more among the foregoing networks, but is not limited thereto. The artificial intelligence model may not only include a hardware structure but may also include an additional or substitutive software structure. At least two of the foregoing processing units and the processors may be implemented as a single integrated component (e.g., a single chip). In some examples, the processing units and the processors may be implemented as respective independent components (e.g., a plurality of chips).

The auxiliary processor 1112 may include a controller 1112-1. The controller 1112-1 may include an interface conversion circuit and a timing control circuit. For example, the controller 1112-1 may include the timing controller 140 shown in FIG. 1. The controller 1112-1 may receive an image signal from the main processor 1111, and may convert a data format of the image signal to a format corresponding to specifications of an interface with the display module 1140 and output image data. The controller 1112-1 may output various control signals for driving the display module 1140.

The controller 1112-1 may control the voltage of the first driving power VDD during the voltage adjustment period. In addition, the controller 1112-1 may control the current of the first driving power VDD during the current adjustment period. To this end, the controller 1112-1 may include the analyzer 142 or 142*a*, the code value generator 144, the power controller 146 or 146*a*, the scale factor generator 148, and the data changing component 149 that are illustrated in FIGS. 5, 6, and 9.

The auxiliary processor 1112 may further include a data conversion circuit 1112-2, a gamma correction circuit 1112-3, a rendering circuit 1112-4, a touch control circuit 1112-5, etc. The data conversion circuit 1112-2 may receive image data from the controller 1112-1, may compensate for the image data to display an image at a desired luminance based on characteristics of the electronic device 1000 or settings of the user, or may convert the image data to reduce power consumption or compensate for afterimages.

The gamma correction circuit 1112-3 may convert image data, a gamma reference voltage, or the like so that an image to be displayed on the electronic device 1000 can have desired gamma characteristics. The rendering circuit 1112-4 may receive image data from the controller 1112-1, and may render the image data taking into account pixel arrangement or the like on the display panel 1141 applied to the electronic device 1000.

The touch control circuit 1112-5 may supply a touch signal to the input sensor 1161-2, and may receive a sensing signal from the input sensor 1161-2 in response to the touch signal.

At least one of the data conversion circuit 1112-2, the gamma correction circuit 1112-3, the rendering circuit 1112-4, and the touch control circuit 1112-5 may be integrated into another component (e.g., the main processor 1111 or the controller 1112-1). At least one among the data conversion circuit 1112-2, the gamma correction circuit 1112-3, and the rendering circuit 1112-4 may be integrated into a source driver 1143 to be described below.

The memory 1120 may store a variety of data to be used in at least one component (e.g., the processor 1110 or the sensor module 1161) of the electronic device 1000, and input data or output data for a command pertaining to the variety of data. Furthermore, the memory 1120 may store a variety of setting data corresponding to settings of the user. The memory 1120 may include at least one or more of the volatile memory 1121 and the nonvolatile memory 1122.

The input module 1130 may receive a command or data to be used in a component (e.g., the processor 1110, the sensor module 1161, or the sound output module 1163) of the electronic device 1000 from an external device (e.g., the user or an external electronic device 2000) provided outside the electronic device 1000.

The input module 1130 may include a first input module 1131 configured to receive a command or data from the user, and a second input module 1132 configured to receive a command or data from the external electronic device 2000. The first input module 1131 may include a microphone, a mouse, a keyboard, a key (e.g., a button), or a pen (e.g., a passive pen or an active pen). The second input module 1132 may support a designated protocol that can be connected to the external electronic device 2000 in a wired or wireless manner. In some embodiments, the second input module 1132 may include a high definition multimedia interface (HDMI), a universal serial bus (USB) interface, an SD card interface, or an audio interface. The second input module 1132 may include a connector, e.g., an HDMI connector, a USB connector, an SD card connector, or an audio connector (e.g., a headphone connector), for physical connection with the external electronic device 2000.

The display module 1140 may provide visual information to the user. The display module 1140 may include a display panel 1141, a gate driver 1142, a source driver 1143, and a voltage generation circuit 1144. The display module 1140 may further include a window, a chassis, and a bracket to protect the display panel 1141. The display module 1140 may include at least some components of the display device 100 illustrated in FIG. 1.

The display panel 1141 (or a display) may include a liquid crystal display panel, an organic light emitting display panel, or an inorganic light emitting display panel. The type of display panel 1141 is not limited to a particular type. The display panel 1141 is a rigid type panel, or a flexible type panel, which is rollable or foldable. The display module 1140 may further include a support, a bracket, or a heat dissipater, which supports the display panel 1141. The display panel 1141 may include the display component 110 illustrated in FIG. 1.

The gate driver 1142 may be mounted on the display panel 1141 as a driving chip. The gate driver 1142 may be integrated on the display panel 1141. For example, the gate driver 1142 may include an amorphous silicon TFT gate (ASG) driver circuit, a low temperature polycrystalline silicon (LTPS) TFT gate driver circuit, or an oxide semiconductor TFT gate (OSG) driver circuit, which is internalized in the display panel 1141. The gate driver 1142 may receive a control signal from the controller 1112-1, and output scan signals to the display panel 1141 in response to the control signal. The gate driver 1142 may include the scan driver 120 illustrated in FIG. 1.

The display module 1140 may further include an emission driver. The emission driver may output an emission control signal to the display panel 1141 in response to a control signal received from the controller 1112-1. The emission driver may be formed separately from the gate driver 1142, or may be integrated into the gate driver 1142.

The source driver 1143 may receive a control signal from the controller 1112-1, convert image data to an analog voltage (e.g., a data signal) in response to the control signal, and output data signals to the display panel 1141. The source driver 1143 may include the data driver 130 illustrated in FIG. 1.

The source driver 1143 may be integrated into another component (e.g., the controller 1112-1). The functions of the interface conversion circuit and the timing control circuit of the controller 1112-1 may be integrated into the source driver 1143. In addition, the display module 1140 may further include the current sensing component 160 illustrated in FIG. 1.

The voltage generation circuit 1144 may output various voltages for driving the display panel 1141. For example, the voltage generation circuit 1144 may include the power generator 150 illustrated in FIG. 1. The voltage generation circuit 1144 may include the DAC 152 and the DC-DC converter 154 illustrated in FIGS. 5, 6, and 9. In some embodiments, the display panel 1141 may include the pixels PX illustrated in FIG. 1.

In some embodiments, the source driver 1143 may convert data that is included in image data received from the processor 1110 and corresponds to red (R), green (G), and blue (B) to a red data signal (or a data voltage), a green data signal, and a blue data signal, and provide the data signals to a plurality of pixel columns included in the display panel 1141 during a single horizontal period.

The power module 1150 may supply power to the components of the electronic device 1000. The power module 1150 may include a battery to store power voltage. The battery may include a primary cell, which cannot be recharged, and a secondary cell or a fuel cell, which are rechargeable. The power module 1150 may include a power management integrated circuit (PMIC). The PMIC may supply optimized power to each of the foregoing modules and modules to be described below. The power module 1150 may include a wireless power transceiver that is electrically connected with the battery. The wireless power transceiver may include a plurality of coiled antenna radiators. In some embodiments, the power module 1150 and at least some components of the voltage generation circuit 1144 may be integrated into a single component. For example, the voltage generation circuit 1144 may be included in the power module 1150.

The electronic device 1000 may further include an embedded module 1160 and an external mounted module 1170. The embedded module 1160 may include a sensor module 1161, an antenna module 1162, and a sound output module 1163. The external mounted module 1170 may include a camera module 1171, a light module 1172, and a communication module 1173.

The sensor module 1161 may sense an input from the body of the user or an input from a pen of the first input module 1131, and generate an electric signal or a data value corresponding to the input. The sensor module 1161 may include at least one or more among a fingerprint sensor 1161-1, an input sensor 1161-2, and a digitizer 1161-3.

The fingerprint sensor 1161-1 may generate a data value corresponding to the fingerprint of the user.

The input sensor 1161-2 may generate a data value corresponding to coordinate information of the input from the body of the user or the input from the pen. The input sensor 1161-2 may generate a data value corresponding to the amount of change in capacitance by the input. The input sensor 1161-2 may sense an input from a passive pen, or transmit or receive data to or from an active pen.

The input sensor 1161-2 may measure a biometric signal pertaining to biometric information such as a blood pressure, body fluid, or body fat. For example, in examples in which the user brings a part of his/her body into contact with the sensor layer or the sensing panel and remains stationary for a certain time, the input sensor 1161-2 may sense a biometric signal, based on a change in electric field by the part of his/her body, and output information desired by the user to the display module 1140.

The digitizer 1161-3 may generate a data value corresponding to coordinate information of an input from a pen. The digitizer 1161-3 may generate data values corresponding to electromagnetic variations caused by the input. The digitizer 1161-3 may sense an input from a passive pen, or transmit or receive data to or from an active pen.

At least one of the fingerprint sensor 1161-1, the input sensor 1161-2, and the digitizer 1161-3 may be implemented as a sensor layer formed on the display panel 1141 through a successive process. At least one among the fingerprint sensor 1161-1, the input sensor 1161-2, and the digitizer 1161-3 may be disposed over the display panel 1141. Any one among the fingerprint sensor 1161-1, the input sensor 1161-2, and the digitizer 1161-3, for example, the digitizer 1161-3, may be disposed under the display panel 1141.

At least two or more among the fingerprint sensor 1161-1, the input sensor 1161-2, and the digitizer 1161-3 may be formed to be integrated into a single sensing panel through the same process. In examples in which at least two or more among the fingerprint sensor 161-1, the input sensor 161-2, and the digitizer 161-3 are integrated into a single sensing panel, the sensing panel may be disposed between the display panel 1141 and a window disposed over the display panel 1141. In some embodiments, the sensing panel may be disposed on the window, and the position of the sensing panel is not particularly limited.

At least one of the fingerprint sensor 1161-1, the input sensor 1161-2, and the digitizer 1161-3 may be embedded in the display panel 1141. In other words, during a process of forming components (e.g., a light emitting element, a transistor, and the like) included in the display panel 1141, at least one among the fingerprint sensor 1161-1, the input sensor 1161-2, and the digitizer 1161-3 may be formed concurrently (e.g., simultaneously) with the components.

In addition, the sensor module 1161 may generate an electrical signal or data value corresponding to internal conditions or external conditions of the electronic device 1000. The sensor module 1161 may further include, for example, a gesture sensor, a gyroscope sensor, an atmospheric sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas to transmit or receive a signal or power to or from an external device. In some embodiments, the communication module 1173 may transmit a signal to an external electronic device or receive a signal from the external electronic device through an antenna suitable for a communication scheme. An antenna pattern of the antenna module 1162 may be integrated into a component of the display module 1140 (e.g., the display panel 1141 of the display module 1140) or the input sensor 1161-2.

The sound output module 1163 may be a device for outputting a sound signal to a device provided outside the electronic device 1000, and, for example, may include a speaker, which is used for typical purposes such as reproducing multimedia or record data, and a receiver, which is used only for phone reception. In some embodiments, the receiver may be integrally or separately formed with a speaker. A sound output pattern of the sound output module 1163 may be integrated into the display module 1140.

The camera module 1171 may capture a static image or a video. In some embodiments, the camera module 1171 may include one or more lenses, an image sensor, or an image signal processor. The camera module 1171 may further include an infrared camera capable of sensing the presence of the user, the position of the user, a line of sight of the user, etc.

The light module 1172 may provide light. The light module 1172 may include a light emitting diode or a xenon lamp. The light module 1172 may be operated interlocking with the camera module 1171 or operated independently therefrom.

The communication module 1173 may form a wired or wireless communication channel between the electronic device 1000 and the external electronic device 2000, and support execution of communication through the formed communication channel. The communication module 1173 may include either or both a wireless communication module such as a cellular communication module, a short-range wireless communication module, or a global navigation satellite system (GNSS) communication module, and a wired communication module such as a local area network (LAN) communication module, or a power line communication module. The communication module 1173 may communicate with the external electronic device 2000 through a short-range communication network such as Bluetooth, WiFi Direct or infrared data association (IrDA), or a long-range communication network such as a cellular network, an internet, or a computer network (e.g., LAN or WAN). The various types of communication modules 1173 described above may be implemented as a single chip or may be implemented as respective separate chips.

The input module 1130, the sensor module 1161, the camera module 1171, and the like, interlocking with the processor 1110, may be used to control the operation of the display module 1140.

The processor 1110 may output a command or data to the display module 1140, the sound output module 1163, the camera module 1171, or the light module 1172, based on input data received from the input module 1130. For example, the processor 1110 may generate image data in response to input data applied through a mouse, an active pen, or the like and output the image data to the display module 1140, or may generate command data in response to input data and output the command data to the camera module 1171 or the light module 1172. In examples in which input data is not received from the input module 1130, the processor 1110 may convert the operation mode of the electronic device 1000 to a low-power mode or a sleep mode, thus reducing the power consumption of the electronic device 1000.

The processor 1110 may output a command or data to the display module 1140, the sound output module 1163, the camera module 1171, or the light module 1172, based on sensing data received from the sensor module 1161. For example, the processor 1110 may compare authentication data applied from the fingerprint sensor 1161-1 with the authentication data stored in the memory 1120, and may execute an application depending on a result of the comparison. The processor 1110 may execute a command based on sensing data sensed by the input sensor 1161-2 or the digitizer 1161-3, or output corresponding image data to the display module 1140. In examples in which the sensor module 1161 includes a temperature sensor, the processor 1110 may receive temperature data for a measured temperature from the sensor module 1161, and further execute a luminance correction operation for the image data based on the temperature data.

The processor 1110 may receive measurement data for the presence of the user, the position of the user, a line of sight of the user, or the like from the camera module 1171. The processor 1110 may further execute a luminance correction operation for the image data based on the measurement data. For example, the processor 1110 that has determined whether the user is present through an input from the camera module 1171 may output, to the display module 1140, image data the luminance of which is corrected by the data conversion circuit 1112-2 or the gamma correction circuit 1112-3.

Some components among the foregoing components may be connected to each other by a communication scheme, e.g., a bus, general purpose input/output (GPIO), a serial peripheral interface (SPI), a mobile industry processor interface (MIPI), or a ultra path interconnect (UPI) link, which can be used between peripheral devices, and may thus exchange a signal (e.g., a command or data) therebetween. The processor 1110 may communicate with the display module 1140 through a predefined interface. For example, any one of the foregoing communication schemes may be used, and the interface is not limited to the foregoing communication schemes.

In a display device, a method of driving the display device, and an electronic device in accordance with embodiments of the present disclosure, power consumption may be reduced by reducing a voltage of a first driving power supply when a static image is displayed. Furthermore, in some embodiments of the present disclosure, luminance of a display component may be increased by increasing the amount of current of the first driving power supply in response to a decrease in the voltage of the first driving power supply.

However, effects of the present disclosure are not limited to the above-described effects, and various modifications are possible without departing from the spirit and scope of the present disclosure.

While embodiments of the present disclosure have been described above, those skilled in the art will appreciate that various modifications, additions and substitutions are possible, without departing from the scope and spirit of the present disclosure claimed in the appended claims.

What is claimed is:

1. A display device comprising:

a display component comprising pixels connected to a first power line, a second power line, scan lines, and data lines;

a sensing resistor between the first power line and the display component;

a current sensing component connected to the sensing resistor, and configured to measure sensing current flowing through the first power line;

a timing controller configured to generate a voltage code based on input data; and a power generator configured to supply first driving power having a voltage corresponding to the voltage code to the first power line, wherein, in response to a static image being displayed on the displayed component, the timing controller is configured to change the voltage code so that the voltage of the first driving power decreases, wherein, in response to a decrease in the voltage of the first driving power, a driving transistor in at least one pixel among the pixels is driven in a linear region, wherein, based on power consumption being reduced by a first power consumption in response to a decrease in the voltage of the first driving power, the timing controller is configured to increase current of the first driving power such that the power consumption increases by the first power consumption.

2. The display device according to claim 1, wherein the timing controller is configured to generate output data by changing the input data such that the current of the first driving power is increased.

3. The display device according to claim 1, wherein the power generator comprises:

an analog-digital converter configured to generate a reference voltage in response to the voltage code; and a DC-DC converter configured to generate the first driving power based on the reference voltage.

4. The display device according to claim 1, wherein the timing controller comprises:

an analyzer configured to extract a load and a peak grayscale value of the input data, and to generate a static image signal in response to the static image being displayed on the display component;

a code value generator configured to generate the voltage code corresponding to the load and the peak grayscale value; and a power controller configured to control the code value generator such that the voltage of the first driving power is reduced in response to the static image signal being inputted.

5. The display device according to claim 4, wherein the analyzer comprises:

a load analyzer configured to calculate the load of the input data; and a grayscale analyzer configured to extract the peak grayscale value of the input data.

6. The display device according to claim 5, wherein the load analyzer is further configured to supply the static image signal to the power controller in response to the static image being displayed on the display component.

7. The display device according to claim 5, wherein the analyzer further comprises a static image determination component configured to supply the static image signal to the power controller in response to the static image being displayed on the display component.

8. The display device according to claim 4, wherein the timing controller comprises:

a scale factor generator configured to set a target current corresponding to the load, and to generate a scale factor such that the sensing current matches the target current; and a data changing component configured to generate output data by reflecting the scale factor in the input data.

9. The display device according to claim 8, wherein the power controller is configured to:

receive the sensing current from the current sensing component, the target current from the scale factor generator, and the static image signal from the analyzer; and receive, from an external device, current reduction information comprising information about a first desired current value that is a current value lower than the target current, frame information comprising information about a certain frame unit, and voltage information comprising information about a certain voltage value.

10. The display device according to claim 9, wherein the current reduction information comprises percentage (%) information, and wherein the power controller is configured to generate the first desired current value by reflecting the percentage information in the target current.

11. The display device according to claim 9, wherein the power controller is further configured to control the code value generator such that, in response to the static image signal being inputted, the voltage of the first driving power decreases by the certain voltage value on a basis of the certain frame unit, and wherein the code value generator is further configured to generate the voltage code such that the voltage of the first driving power decreases by the certain voltage value on a basis of the certain frame unit in response to control of the power controller.

12. The display device according to claim 11, wherein the power controller is further configured to control the code value generator such that the voltage of the first driving power decreases until the sensing current is set to the first desired current value.

13. The display device according to claim 11, wherein, during a period in which the voltage of the first driving power is controlled by the power controller, the scale factor generator is further configured to maintain the scale factor at a constant value.

14. The display device according to claim 11, wherein the power controller is further configured to supply information about a second desired current value that is a current value higher than the target current to the scale factor generator.

15. The display device according to claim 14, wherein the scale factor generator is further configured to generate the scale factor such that, after the voltage of the first driving power decreases and the sensing current is set to approximately the first desired current value, current of the first driving power has the second desired current value.

16. A method of driving a display device, comprising:

controlling a voltage of first driving power in response to a load and a peak grayscale value of input data;

decreasing the voltage of the first driving power in response to a static image being displayed on a display component comprising pixels, wherein decreasing the voltage of the first driving power comprises decreasing the voltage of the first driving power such that a driving transistor in at least one pixel among the pixels is driven in a linear region; and based on power consumption being reduced by first power consumption in response to a decrease in the voltage of the first driving power, increasing current flowing through the first driving power such that the power consumption increases by approximately the first power consumption.

17. An electronic device comprising:

a display panel comprising pixels;

a voltage generation circuit configured to supply first driving power having a certain voltage to the display panel based on a voltage code;

a current sensing component configured to measure a voltage of the first driving power supplied to the display panel and to generate sensing current; and a controller configured to generate the voltage code based on input data, wherein, in response to a static image being displayed on the display panel, the controller is further configured to change the voltage code so that the voltage of the first driving power decreases, and wherein the voltage of the first driving power decreases so that a driving transistor in at least one pixel among the pixels is driven in a linear region, wherein, based on power consumption being reduced by a first power consumption in response to a decrease in the voltage of the first driving power, the controller generates output data by changing the input data such that the power consumption increases by approximately the first power consumption.

* * * * *